US011290696B2

(12) United States Patent
Stauder et al.

(10) Patent No.: US 11,290,696 B2
(45) Date of Patent: Mar. 29, 2022

(54) HUE CHANGING COLOR GAMUT MAPPING

(71) Applicant: InterDigital CE Patent Holdings, SAS, Paris (FR)

(72) Inventors: Jurgen Stauder, Montreuil/Ille (FR); Anita Orhand, Cesson-Sevigne (FR); Corinne Poree, Rennes (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 0 days.

(21) Appl. No.: 16/489,617

(22) PCT Filed: Feb. 26, 2018

(86) PCT No.: PCT/EP2018/054696
§ 371 (c)(1),
(2) Date: Aug. 28, 2019

(87) PCT Pub. No.: WO2018/158199
PCT Pub. Date: Sep. 7, 2018

(65) Prior Publication Data
US 2020/0120318 A1    Apr. 16, 2020

(30) Foreign Application Priority Data
Feb. 28, 2017  (EP) .................... 17305218

(51) Int. Cl.
*H04N 9/31* (2006.01)
*H04N 9/64* (2006.01)
*H04N 9/68* (2006.01)

(52) U.S. Cl.
CPC .......... *H04N 9/3182* (2013.01); *H04N 9/643* (2013.01); *H04N 9/68* (2013.01)

(58) Field of Classification Search
CPC ......... H04N 9/3182; H04N 9/643; H04N 9/68
See application file for complete search history.

(56) References Cited

U.S. PATENT DOCUMENTS 5,297,058 A * 3/1994 Samworth ............. H04N 1/465
348/32
5,424,545 A * 6/1995 Block ................. A61B 5/14546
250/343

(Continued)

FOREIGN PATENT DOCUMENTS

EP     3067882 A1    9/2016
EP     3110124 A1    12/2016

(Continued)

OTHER PUBLICATIONS

Giesen, J., et al., "Image-Dependent Gamut Mapping as Optimization Problem" IEEE Transactions on Image Processing vol. 16 No. 10, pp. 2401-2410 (2007) 10.1109/TIP.2007.904455.

(Continued)

*Primary Examiner* — Charles L Beard
(74) *Attorney, Agent, or Firm* — Invention Mine LLC

(57) ABSTRACT

An aspect of present principles is directed to methods and systems for gamut mapping colors from a either a source color gamut or a content color gamut towards a target color gamut. A source hue of the source specific colors and a source hue of the content specific colors is changed towards a target hue of the corresponding target specific colors. Color gamut mapping is performed for the source colors of either the whole source color gamut or the content color gamut towards the target color gamut based on the mapped specific colors. The specific colors are selected from primary colors, secondary colors, a group of primary colors and secondary colors.

20 Claims, 10 Drawing Sheets

(56) References Cited

U.S. PATENT DOCUMENTS

| | | | | |
|---|---|---|---|---|
| 5,434,412 A * | 7/1995 | Sodickson | ......... | A61B 5/14532 250/343 |
| 5,506,603 A * | 4/1996 | Kawano | ................ | G06T 11/001 345/179 |
| 5,574,666 A * | 11/1996 | Ruetz | ................... | H04N 1/6033 347/43 |
| 5,998,617 A * | 12/1999 | Srinivasa | ............. | C07D 213/22 544/347 |
| 6,020,987 A * | 2/2000 | Baumann | ......... | B32B 17/10513 359/273 |
| 6,198,552 B1 * | 3/2001 | Nagae | ................... | H04N 1/6027 358/515 |
| 6,236,406 B1 * | 5/2001 | Li | ............................ | H04N 1/60 345/426 |
| 6,280,034 B1 * | 8/2001 | Brennesholtz | ....... | H04N 9/3117 353/20 |
| 6,400,843 B1 * | 6/2002 | Shu | ...................... | H04N 1/6058 345/590 |
| 6,437,792 B1 * | 8/2002 | Ito | ........................ | H04N 1/6058 345/590 |
| 6,573,889 B1 * | 6/2003 | Georgiev | .............. | G06T 3/0093 345/419 |
| 6,618,499 B1 * | 9/2003 | Kohler | ................... | H04N 1/6058 358/518 |
| 6,674,487 B1 | 1/2004 | Smith | | |
| 6,698,890 B1 * | 3/2004 | Jorke | ..................... | H04N 13/334 353/7 |
| 6,753,829 B2 * | 6/2004 | Ouchi | ................... | H04N 9/3114 345/30 |
| 6,778,185 B1 * | 8/2004 | Moroney | ............. | H04N 1/6058 345/590 |
| 7,414,631 B2 | 8/2008 | Tin | | |
| 7,573,610 B2 * | 8/2009 | Um | ...................... | H04N 1/6058 358/1.9 |
| 7,684,084 B2 * | 3/2010 | Fan | ...................... | H04N 1/6019 358/1.9 |
| 7,746,411 B1 * | 6/2010 | Balram | .................... | H04N 9/68 348/649 |
| 7,843,465 B1 * | 11/2010 | Shaick | .................... | H04N 9/64 345/600 |
| 7,911,479 B2 * | 3/2011 | Yao | .......................... | G09G 5/02 345/590 |
| 7,940,982 B1 * | 5/2011 | Shaick | .................... | H04N 1/46 382/162 |
| 7,959,295 B2 * | 6/2011 | Richards | .............. | H04N 13/334 353/7 |
| 8,023,149 B2 * | 9/2011 | Matsuoka | ............ | H04N 1/6005 358/1.9 |
| 8,026,953 B2 * | 9/2011 | Lammers | ................. | H04N 9/67 348/223.1 |
| 8,154,559 B2 * | 4/2012 | Stauder | ............... | H04N 1/6058 345/590 |
| 8,300,932 B2 * | 10/2012 | Ishikawa | ................. | H04N 1/62 382/167 |
| 8,351,724 B2 * | 1/2013 | Xu | .......................... | H04N 1/58 382/254 |
| 8,437,053 B2 * | 5/2013 | Edge | .................... | H04N 1/6058 358/520 |
| 8,537,177 B2 * | 9/2013 | Bhaskaran | ............ | G09G 5/02 345/600 |
| 8,593,479 B2 * | 11/2013 | Park | ........................ | G09G 5/02 345/590 |
| 8,629,881 B2 * | 1/2014 | Blonde | ................ | H04N 1/6058 345/590 |
| 8,711,168 B2 * | 4/2014 | Richards | ............... | H04N 9/3158 345/590 |
| 8,941,679 B2 * | 1/2015 | Stauder | ................ | H04N 1/6016 345/593 |
| 9,466,260 B2 * | 10/2016 | Higgins | ............... | H04N 1/6019 |
| 9,472,162 B2 * | 10/2016 | Stauder | ................ | G09G 5/02 |
| 9,661,299 B2 * | 5/2017 | Stauder | ................ | H04N 13/15 |
| 10,148,907 B1 * | 12/2018 | Wu | ......................... | H04N 5/20 |
| 10,169,886 B2 * | 1/2019 | Stauder | .................... | H04N 9/67 |
| 10,270,943 B2 * | 4/2019 | Thebault | ............ | G06T 3/4007 |
| 10,284,750 B2 * | 5/2019 | Morvan | ............... | H04N 1/6097 |
| 10,517,156 B1 * | 12/2019 | Qiu | ........................ | H05B 45/28 |
| 10,531,105 B2 * | 1/2020 | Li | ........................ | H04N 19/105 |
| 10,588,194 B1 * | 3/2020 | Qiu | ........................ | H05B 45/24 |
| 10,602,027 B2 * | 3/2020 | Stauder | ............... | H04N 1/6058 |
| 10,607,527 B1 * | 3/2020 | Mandle | ............... | G02B 27/141 |
| 10,614,596 B2 * | 4/2020 | Rao | ........................ | G06T 11/001 |
| 10,663,609 B2 * | 5/2020 | Al-Dossary | ............ | G01V 1/345 |
| 10,742,849 B2 * | 8/2020 | Thebault | ............... | H04N 1/6058 |
| 10,827,592 B1 * | 11/2020 | McReynolds | ............. | F21S 9/02 |
| 10,841,627 B2 * | 11/2020 | Lee | ........................ | H04N 21/435 |
| 2002/0113982 A1 * | 8/2002 | Chang | .................. | H04N 1/6025 358/1.9 |
| 2002/0122208 A1 * | 9/2002 | Siegeritz | ................ | H04N 1/6033 358/2.1 |
| 2002/0141638 A1 * | 10/2002 | Lee | ...................... | H04N 1/6027 382/165 |
| 2003/0072015 A1 * | 4/2003 | Fujino | .................. | H04N 1/6005 358/1.9 |
| 2003/0223633 A1 * | 12/2003 | Pohjola | .................. | H04N 19/94 382/166 |
| 2003/0234911 A1 * | 12/2003 | Horvath | ............... | H04N 9/3105 353/31 |
| 2004/0008283 A1 * | 1/2004 | Yang | ..................... | H04N 9/646 348/656 |
| 2004/0071340 A1 * | 4/2004 | Kondo | ................. | H04N 1/6075 382/162 |
| 2004/0085327 A1 * | 5/2004 | Jones | ..................... | G09B 29/02 345/591 |
| 2004/0184005 A1 * | 9/2004 | Roth | ..................... | H04N 9/312 353/20 |
| 2004/0218075 A1 * | 11/2004 | Tsuruoka | ............... | H04N 9/646 348/272 |
| 2004/0239814 A1 * | 12/2004 | Hirashima | ............. | H04N 9/643 348/649 |
| 2005/0219574 A1 * | 10/2005 | Ok | ........................ | H04N 1/6058 358/1.9 |
| 2005/0225630 A1 * | 10/2005 | Childers | ............... | H04N 13/359 348/51 |
| 2005/0248784 A1 * | 11/2005 | Henley | ................ | H04N 1/6058 358/1.9 |
| 2005/0276471 A1 * | 12/2005 | Shin | ..................... | H04N 9/3182 382/162 |
| 2005/0280848 A1 * | 12/2005 | Seko | ................... | H04N 1/6058 358/1.9 |
| 2005/0280850 A1 * | 12/2005 | Kim | ..................... | H04N 9/3182 358/1.9 |
| 2005/0280851 A1 * | 12/2005 | Kim | ..................... | H04N 1/60 358/1.9 |
| 2006/0152524 A1 * | 7/2006 | Miller | ..................... | H04N 9/67 345/589 |
| 2006/0188156 A1 * | 8/2006 | Kwak | ................... | H04N 1/628 382/167 |
| 2006/0221396 A1 * | 10/2006 | Sloan | ..................... | H04N 1/60 358/3.01 |
| 2006/0244982 A1 * | 11/2006 | Zeng | ...................... | G09G 5/02 358/1.9 |
| 2006/0244983 A1 * | 11/2006 | Zeng | ................... | H04N 1/6058 358/1.9 |
| 2006/0280360 A1 * | 12/2006 | Holub | .................. | H04N 17/045 382/162 |
| 2007/0019860 A1 * | 1/2007 | Yoshida | ................ | H04N 1/62 382/162 |
| 2007/0085789 A1 * | 4/2007 | De Vaan | ................. | G09G 5/02 345/88 |
| 2007/0085855 A1 * | 4/2007 | Tin | .......................... | G09G 5/02 345/590 |
| 2007/0086027 A1 * | 4/2007 | Tin | .......................... | G09G 5/02 358/1.9 |
| 2007/0126933 A1 * | 6/2007 | Ting | ..................... | G09G 5/026 348/649 |
| 2007/0188711 A1 * | 8/2007 | Sharp | .................. | G09G 3/3413 353/8 |

(56) References Cited

U.S. PATENT DOCUMENTS

| | | | |
|---|---|---|---|
| 2007/0211272 A1* | 9/2007 | Kang | H04N 1/6058 358/1.9 |
| 2007/0211277 A1* | 9/2007 | Kaneko | H04N 1/6022 358/1.14 |
| 2007/0223016 A1* | 9/2007 | Ichitani | H04N 1/6025 358/1.9 |
| 2007/0236761 A1* | 10/2007 | Sloan | H04N 1/6058 358/520 |
| 2007/0273738 A1* | 11/2007 | Tsuchiya | H04N 1/6075 347/100 |
| 2008/0043260 A1* | 2/2008 | Ramanath | G09G 5/06 358/1.9 |
| 2008/0137947 A1* | 6/2008 | Sawada | H04N 9/646 382/167 |
| 2008/0218779 A1* | 9/2008 | Shirasawa | H04N 1/6058 358/1.9 |
| 2008/0240552 A1* | 10/2008 | Wang | H04N 1/6058 382/162 |
| 2008/0259369 A1* | 10/2008 | Kanai | H04N 1/6058 358/1.9 |
| 2008/0278574 A1* | 11/2008 | Ramstad | H04N 13/334 348/51 |
| 2008/0297530 A1* | 12/2008 | Ramstad | G09G 3/003 345/589 |
| 2009/0021809 A1* | 1/2009 | Ramanath | H04N 9/643 358/520 |
| 2009/0102968 A1* | 4/2009 | Doser | G06T 11/001 348/467 |
| 2009/0103805 A1* | 4/2009 | Huang | H04N 9/68 382/167 |
| 2009/0135213 A1* | 5/2009 | Tomizawa | G09G 3/2003 345/697 |
| 2009/0141039 A1* | 6/2009 | Ramanath | G09G 3/346 345/590 |
| 2009/0141041 A1* | 6/2009 | Stauder | H04N 1/6058 345/590 |
| 2009/0154798 A1* | 6/2009 | Mizukura | H04N 1/6058 382/162 |
| 2009/0154803 A1* | 6/2009 | Mizukura | G09G 5/02 382/166 |
| 2009/0168415 A1* | 7/2009 | Franciscus Deurenberg | H05B 47/19 362/233 |
| 2009/0285478 A1* | 11/2009 | Thiebaud | H04N 1/6058 382/166 |
| 2010/0008427 A1* | 1/2010 | Chiu | H04N 9/64 375/240.18 |
| 2010/0020242 A1* | 1/2010 | Lammers | H04N 9/67 348/642 |
| 2010/0110312 A1* | 5/2010 | Muijs | H04N 1/6058 348/802 |
| 2010/0128976 A1* | 5/2010 | Stauder | H04N 1/6058 382/162 |
| 2010/0156929 A1* | 6/2010 | Kuo | H04N 1/6058 345/604 |
| 2010/0220237 A1* | 9/2010 | Doser | H04N 1/6058 348/649 |
| 2010/0302404 A1* | 12/2010 | Mizukura | H04N 1/6058 348/222.1 |
| 2010/0328341 A1* | 12/2010 | Stauder | H04N 1/6016 345/593 |
| 2011/0007088 A1* | 1/2011 | Park | G09G 5/02 345/590 |
| 2011/0051207 A1* | 3/2011 | Dalrymple | H04N 1/6058 358/518 |
| 2011/0255101 A1* | 10/2011 | Edge | H04N 1/6058 358/1.9 |
| 2011/0293177 A1* | 12/2011 | Wang | H04N 1/465 382/167 |
| 2012/0008006 A1* | 1/2012 | Muramatsu | H04N 5/2355 348/222.1 |
| 2012/0019843 A1* | 1/2012 | Kishimoto | H04N 1/6075 358/1.9 |
| 2012/0075644 A1* | 3/2012 | Clock | H04N 1/6058 358/1.9 |
| 2012/0195498 A1* | 8/2012 | Miyazaki | H04N 1/603 382/162 |
| 2013/0050545 A1* | 2/2013 | Komatsu | H04N 9/646 348/242 |
| 2013/0119275 A1* | 5/2013 | Solarz | H01L 33/44 250/459.1 |
| 2013/0156312 A1* | 6/2013 | Kawashima | G06T 5/007 382/167 |
| 2013/0222411 A1* | 8/2013 | Tripathi | H04N 9/68 345/590 |
| 2013/0222436 A1* | 8/2013 | Park | G09G 5/06 345/690 |
| 2013/0250320 A1* | 9/2013 | Kishino | G06K 15/1878 358/1.9 |
| 2014/0002481 A1* | 1/2014 | Broughton | G09G 5/02 345/591 |
| 2014/0198102 A1* | 7/2014 | Kim | A61B 8/483 345/419 |
| 2015/0062152 A1* | 3/2015 | Loeffler | G06T 11/001 345/601 |
| 2015/0077431 A1* | 3/2015 | Tsukada | G09G 5/02 345/600 |
| 2015/0172670 A1* | 6/2015 | Li | H04N 19/136 375/240.08 |
| 2015/0179135 A1* | 6/2015 | Stauder | H04N 9/67 382/167 |
| 2015/0221281 A1* | 8/2015 | Bosco | H04N 9/3182 345/590 |
| 2015/0281520 A1* | 10/2015 | Sawada | H04N 1/40093 358/474 |
| 2015/0281523 A1* | 10/2015 | Higgins | G09G 5/06 345/601 |
| 2015/0304523 A1* | 10/2015 | Imaseki | H04N 1/603 358/1.9 |
| 2015/0356945 A1* | 12/2015 | Fazzini | G09G 5/02 345/590 |
| 2016/0112603 A1* | 4/2016 | Mahy | H04N 1/6033 358/3.08 |
| 2016/0117967 A1* | 4/2016 | Buckley | G09G 3/2003 345/691 |
| 2016/0117968 A1* | 4/2016 | Buckley | G09G 3/2003 345/590 |
| 2016/0139529 A1* | 5/2016 | Iguchi | G03G 15/5062 399/39 |
| 2016/0155245 A1* | 6/2016 | Stauder | G06T 11/001 382/167 |
| 2016/0210935 A1* | 7/2016 | Wang | G09G 3/3466 |
| 2016/0212304 A1* | 7/2016 | Gish | H04N 9/12 |
| 2016/0249029 A1* | 8/2016 | Takasumi | H04N 9/735 |
| 2016/0295219 A1* | 10/2016 | Ye | H04N 1/64 |
| 2016/0322024 A1* | 11/2016 | Stauder | H04N 1/6063 |
| 2016/0371816 A1* | 12/2016 | Choudhury | G06T 7/254 |
| 2016/0379595 A1* | 12/2016 | Stauder | H04N 9/643 345/590 |
| 2016/0381254 A1* | 12/2016 | Poree | H04N 1/6066 382/167 |
| 2017/0048420 A1* | 2/2017 | Morovic | H04N 1/6008 |
| 2017/0116955 A1* | 4/2017 | Stauder | H04N 1/6066 |
| 2017/0142446 A1* | 5/2017 | Leleannec | H04N 19/65 |
| 2017/0201652 A1* | 7/2017 | Hirano | G06K 15/1878 |
| 2017/0208218 A1* | 7/2017 | Morvan | H04N 1/6058 |
| 2017/0223367 A1* | 8/2017 | Stessen | G06T 5/009 |
| 2017/0330529 A1* | 11/2017 | Van Mourik | G09G 3/2003 |
| 2017/0339301 A1* | 11/2017 | Pjanic | H04N 1/405 |
| 2017/0359490 A1* | 12/2017 | Mazzante | H04N 1/6061 |
| 2017/0359491 A1* | 12/2017 | Stauder | H04N 1/646 |
| 2018/0007372 A1* | 1/2018 | Lasserre | H04N 19/30 |
| 2018/0013927 A1* | 1/2018 | Atkins | G09G 5/02 |
| 2018/0025464 A1* | 1/2018 | Yeung | H04N 5/20 348/234 |
| 2018/0027252 A1* | 1/2018 | Lasserre | H04N 19/126 382/233 |
| 2018/0047367 A1* | 2/2018 | Stauder | G09G 5/02 |

(56) References Cited

U.S. PATENT DOCUMENTS

| | | | |
|---|---|---|---|
| 2018/0191925 A1* | 7/2018 | Stauder | H04N 1/6075 |
| 2018/0234704 A1* | 8/2018 | Atkins | H04N 19/87 |
| 2018/0324329 A1* | 11/2018 | Th | H04N 1/6058 |
| 2018/0350047 A1* | 12/2018 | Baar | G06T 5/009 |
| 2018/0352257 A1* | 12/2018 | Leleannec | G06T 5/009 |
| 2018/0374192 A1* | 12/2018 | Kunkel | G06T 3/0087 |
| 2019/0008013 A1* | 1/2019 | Diana | H05B 45/20 |
| 2019/0265552 A1* | 8/2019 | Shiomi | G06T 5/00 |
| 2019/0311694 A1* | 10/2019 | Van Mourik | H04N 19/46 |
| 2019/0311695 A1* | 10/2019 | Stauder | G09G 5/10 |
| 2019/0356891 A1* | 11/2019 | Zhang | H04N 9/67 |
| 2019/0385343 A1* | 12/2019 | Rao | G06T 5/003 |
| 2020/0014923 A1* | 1/2020 | Foessel | H04N 19/119 |
| 2020/0028991 A1* | 1/2020 | Thebault | H04N 1/6058 |
| 2020/0034675 A1* | 1/2020 | Morovic | H04N 1/405 |
| 2020/0045206 A1* | 2/2020 | Yim | G09G 3/2003 |
| 2020/0092441 A1* | 3/2020 | Su | H04N 9/67 |
| 2020/0106928 A1* | 4/2020 | Thebault | H04N 1/6075 |
| 2020/0169742 A1* | 5/2020 | Su | H04N 19/70 |
| 2020/0186680 A1* | 6/2020 | Morovic | H04N 1/60 |
| 2020/0193573 A1* | 6/2020 | Th | H04N 1/6058 |
| 2020/0214097 A1* | 7/2020 | Qiu | H05B 45/325 |
| 2020/0258442 A1* | 8/2020 | Mandle | H04N 9/3147 |
| 2020/0294439 A1* | 9/2020 | Mandle | G09G 3/2003 |
| 2020/0357146 A1* | 11/2020 | Vallespi | G06T 11/001 |
| 2020/0402441 A1* | 12/2020 | Mandle | G09G 5/02 |
| 2020/0404234 A1* | 12/2020 | Th | H04N 19/186 |
| 2021/0012165 A1* | 1/2021 | Jiang | G06K 9/6256 |
| 2021/0020094 A1* | 1/2021 | Bogdanowicz | G09G 3/346 |
| 2021/0020118 A1* | 1/2021 | Kang | G09G 3/3413 |
| 2021/0020120 A1* | 1/2021 | Kang | G09G 3/3413 |
| 2021/0027693 A1* | 1/2021 | Mandle | G02B 5/201 |
| 2021/0035487 A1* | 2/2021 | Bogdanowicz | G02F 1/133514 |
| 2021/0040328 A1* | 2/2021 | Gianetti | C09D 7/68 |
| 2021/0043127 A1* | 2/2021 | Bogdanowicz | G02F 1/133514 |
| 2021/0174728 A1* | 6/2021 | Bogdanowicz | G02F 1/133514 |

FOREIGN PATENT DOCUMENTS

| | | | | |
|---|---|---|---|---|
| WO | WO-2016206981 A | * | 12/2016 | G06T 3/4007 |
| WO | WO2016206981 A1 | | 12/2016 | |

OTHER PUBLICATIONS

Green P., et al., "Developing the CARISMA gamut mapping model" Journal of Imaging Science and Technology, vol. 46 pp. 33-43 (2002).

Ebner, F., et al., "Development and Testing of a Color Space (IPT) with Improved Hue Uniformity" Final Program and Proceedings—IS and T/SID Color Imaging Conference. pp. 8-13 (1998).

Morovic, J., et al, "The Fundamentals of Gamut Mapping: A Survey" Journal of Imaging Science and Technology, vol. 45 pp. 283-290 (2001).

Zolliker, P., et al., "On the continuity of gamut mapping algorithms" Proceedings of SPIE—The International Society for Optical Engineering vol. 5667 pp. 220-233 (2005).

Montag, E., et al, "Evaluation of gamut mapping techniques using simple rendered images and artificial gamut boundaries" IEEE Transactions on Image Processing vol. 6 No. 7 pp. 977-989. 10.1109/83.597273 (1997).

* cited by examiner

HUE CHANGING COLOR GAMUT MAPPING

This application claims the benefit, under 35 U.S.C. § 365 of International Application PCT/EP2018/054696, filed Feb. 26, 2018, which was published in accordance with PCT Article 21(2) on Sep. 7, 2018, in English, and which claims the benefit of European Patent Application No. 17305218.4, filed Feb. 28, 2017.

TECHNICAL FIELD

The present invention relates to color processing of source colors. The present invention further relates to a hue changing color gamut mapping for changing a hue of the source colors towards a hue of the target colors.

BACKGROUND ART

One way of performing image and video processing color processing is known as color gamut mapping.

A "color gamut" is a set of colors. For example, a color gamut may be the set of: colors of real objects under real illumination; colors of image(s) reproduced for display on a monitor or by film projection; synthesized colors in an animated film (e.g., CGI animation); or any other colors visible by a human or by a light capturing apparatus. In practice, color gamuts may be defined by scene illumination, real objects, image capturing devices, image reproduction devices, color spaces, standards such as NTSC, ITU-R BT rec. 709 ("rec. 709"), ITU-R BT rec. 2020 ("rec. 2020"), Adobe RGB, DCI-P3, or any other present or future standards for color reproduction or any other constraint(s) on color variety.

"Color gamut mapping" is the process of mapping or redistributing colors of a source color gamut ("source colors") to colors of a target color gamut ("target colors"). The source color gamut may be associated with any color gamut. Likewise, the target color gamut may also be associated with any color gamut. For example, a source color gamut may be associated with input image data according to a standard and a target color gamut may be associated with a display device (e.g., a user device). Color gamut mapping may include changes to the saturation, hue, lightness, contrast or other aspects of colors, changes to blacks, whites or other color aspects of the source and/or target color gamut(s). For example, color gamut mapping may include tone mapping.

Color gamut mapping has important applications in the fields of image and video processing (e.g., video content production or post-production). For example, color gamut mapping is an important tool for color processing of video content (e.g., color gamut mapping may be utilized to ensure that a device's display constraints are met). Color gamut mapping may also be used to meet artistic requirements and/or as a tool by a colorist. Color gamut mapping may also be used to convert an original video into different video types for reproduction or transmission, such as for cinema, television, or the Internet. Color gamut mapping can also be used in a camera. For example, in the camera, color gamut mapping may be used to adapt a scene captured by the camera sensor to a given standard, so that the captured colors can be accurately reproduced (e.g., on a display device). The source camera gamut can be defined depending on the color filters of the camera sensor. Color gamut mapping might also be used in a display device to accurately display an image or video content. The target display gamut may be defined by the primary colors of the display panel. During processing, color gamut mapping may be repeated at various pixel frequencies.

Discussions of color gamut mapping include:
  J. Morovic and M. R. Luo, "The Fundamentals of Gamut Mapping: A Survey", Journal of Imaging Science and Technology, 45/3:283-290, 2001.
  Montag E. D., Fairchild M. D, "Psychophysical Evaluation of Gamut Mapping Techniques Using Simple Rendered Images and Artificial Gamut Boundaries", IEEE Trans. Image Processing, 6:977-989, 1997.
  P. Zolliker, M. Dätwyler, K. Simon, On the Continuity of Gamut Mapping Algorithms, Color Imaging X: Processing, Hardcopy, and Applications. Edited by Eschbach, Reiner; Marcu, Gabriel G. Proceedings of the SPIE, Volume 5667, pp. 220-233, 2004.

Existing color gamut mapping methods are problematic because they result in a deterioration of the consistency of colors (e.g., a deformation of the neighborhood in the resulting target color gamut) after color gamut mapping. Such problems arise from the existing methods' compression or expansion of saturation and/or of hue and/or of lightness of colors in relation to the boundaries of the source and the target color gamuts. In fact, these boundaries have rims where they are not differentiable, creating hereby deformation of color neighborhood when used to define color gamut mapping methods. The lightness of a color may be specified by the L coordinate of the CIELAB color space, or Lab color space, such as defined by the CIE in 1976. Similarly the lightness may also be specified by the I coordinate of the IPT color space. For example, Ebner Fritz and Mark D. Fairchild, "Development and testing of a color space (IPT) with improved hue uniformity", Color and Imaging Conference in 1998 discusses lightness. However lightness, intensity or luminance could be used without change. The hue of a color can be obtained using psychophysical experiments. However different viewing conditions and/or different models can lead to different hue definitions. The hue of a color might be specified by a cylindrical angle of the cylindrical coordinate representation of the color space, for example in CIELAB color space. Alternatively hue may be obtained from the color coordinates using a formula (e.g. in a RGB color space, the hue might be defined by $$\text{hue} = \arctan\left(\frac{\sqrt{3} * (G-B)}{2 * R - G - B}\right)$$

the boundary of a color gamut in a color space is a hull including all the colors of the color gamut.

A large part of existing color gamut mapping methods either compress or expand the saturation (or chroma) of colors and/or the lightness of colors in relation to boundaries of color gamuts. In color gamut mapping, non-uniform saturation modifications may occur when there is significant mismatch between primary colors defining the source color gamut and primary colors defining the target color gamut (e.g., misaligned gamut boundaries). Thus, the modification of saturation induced by cusp color gamut mapping can be quite different for similar hues (for example for hue angle 75° the saturation might be divided by a factor of 1.6 and while for hue angle 85° the saturation might be divided by a factor 1.2). This results in the problem of a degradation of the consistency of mapped colors in a color neighborhood.

Additional problems occur when a singular point (e.g. a primary or secondary color) in the gamut boundary of the source color gamut and the corresponding singular point in the gamut boundary of the target color gamut have different hues. At these points, the gamut boundaries change surface orientation abruptly and are not differentiable. The color neighborhood can degrade during color gamut mapping using chroma compression or expansion when a source color has the same hue as such a discontinuity of gamut boundary curvature. The negative impact on the color neighborhood may be even stronger if, while other conditions remain the same, if the hues of corresponding singular points of the boundaries of the source and target color gamuts, respectively, are close but not identical.

To avoid these problems, full hue rotation mapping is discussed by Green and Luo in their paper "Extending the CARISMA gamut mapping model" published at the conference Color Image Science in 2000. Full hue rotation aligns the hues of source and target color gamut such that at least the non differentiable points of the cusp lines have the same hue. Full hue rotation has the additional advantage that most saturated source colors—the primary and secondary colors—become the most saturated target colors—the primary and secondary target colors. This preserves an artistic intent. However, this full hue rotation results in the problem of significantly shifting hues.

Full hue rotation is also used in U.S. Patent Publication No. US2005/248784 to Henley et al. ("Henley"). Henley discloses a color gamut mapping method called shear mapping. The shear mapping maps in a constant-hue leaf in a color space, for example CIELAB color space, the cusp of the source gamut to the cusp of the target gamut. The cusp in a constant-hue leaf is the color wiuth highest chroma. Henley discloses a hue rotation, which is performed so as to maintain a maximum level of hue saturation. The hue rotation in Henley is a full hue rotation that maps the hue of each primary and secondary color of the input (the source color gamut) to the hue of a primary or a secondary color in the destination (the target color gamut).

Another reference is WO2016206981 that tries to solve the problem by applying a partial hue shift. This method adaptively changes the hue a source specific color towards a target hue of the corresponding target specific color based on the difference of the source specific color and the target specific color. The specific colors can include primary and secondary colors. This method has the ability to preserve partially artistic intent since maximum hue shift is only applied when needed. Additionally, most saturated source colors—the primary and secondary colors—are more saturated if partial hue mapping is applied before chroma mapping than if no hue mapping is applied. Another advantage includes partial preservation of color neighborhood increasing the uniformity of the modification of saturation of a gamut mapping.

However, the majority of known methods for color mapping source colors are designed to map source colors that distribute largely the source color gamut. For example, the advantages of CARISMA or WO2016206981 only hold under this assumption. In fact, CARISMA and WO2016206981 largely depends on the shape of the source color gamut. If the shape of color gamut of the actual source colors, called content gamut, does not correspond to the shape of the source color gamut, advantages of the gamut mapping presented in CARISMA or WO2016206981 do not hold.

If the source colors of a content do not populate the whole source color gamut, the content is in fact smaller than the source color gamut. For example, in an image encoded in ITU-R BT.2020 RGB color coordinates, there are no red objects. The content gamut of this image is thus smaller than the source color gamut of ITU-R BT.2020 and does not contain red colors. Gamut mapping methods that map the content gamut instead of the source color gamut into the target color gamut are called image-dependent or content-dependent methods. On the contrary, methods mapping the whole source color gamut into the target color gamut are called device-dependent methods, since the source color gamut often corresponds to a source color device. Giesen et al. investigate in their article entitled "Image-Dependent Gamut Mapping Dependent Gamut Mapping as Optimization Problem" that is published in the IEEE Transactions on Image Processing, Vol. 16, no. 10, October 2007 some methods for content-dependent mapping. The authors compare these methods to known device-dependent methods.

When representing a content using color coordinates of a source color space having a source color gamut, the content color gamut is always equal or smaller than the source color gamut, by definition. However, other cases are possible. In a general case, a first content may be produced within a first source color space having a first source color gamut and a second content may be produced within a second source color space having a second source color gamut. In this general case, the gamut mapping method may be used to map colors from either the first or the second color gamut towards the target color gamut. However, known methods such as CARISMA or WO2016206981 indented to map the first source color gamut to the target color gamut do not realize their advantages when the content populates a second source color gamut. In the same way, known methods such as CARISMA or WO2016206981 indented to map the second source color gamut to the target color gamut do not realize their advantages when the content populates a first source color gamut.

In another general case, content may be produced within a second source color space having a second source color gamut and then represented within a first source color space having a first source color gamut. If the second source color gamut is not included within the first source color gamut, negative color coordinates of the first source color space are used according to state of the art in order to represent colors from the second source color gamut that are outside of the first source color gamut. In this another general case, the above described mapping method can be used to map colors from either the first or the second color gamut towards the target color gamut.

All known gamut mapping algorithms have the problem that they are not optimal at the same time for the source color gamut and for the content color gamut or for a first source color gamut and another, second source color gamut. This becomes clear in the following use case. A sample, single gamut mapping method is used for two types of images. The first type of images contains a first type of source colors that are distributed all over the source color gamut. The second type of images contains a second type of source colors that are distributed within a content color gamut that is different and smaller than the source color gamut. All images are encoded in color coordinates of the same source color space having the source color gamut. All known gamut mapping methods are not optimal for this use case since they are not optimized at the time for the source color gamut and for the content color gamut.

For example, WO2016206981 is optimized for the source color gamut, but color neighborhood may not be best preserved if images of the second type are to be mapped.

Furthermore, most saturated content colors—the primary and secondary colors of the content color gamut, are not mapped to or in direction to most saturated colors of target color gamut—the primary and secondary colors of the target color gamut. Instead, most saturated content colors are mapped into direction of other, less saturated target colors inducing a larger reduction of saturation. For example, the methods investigated by Giesen et al. are optimized for the content color gamut, but color neighborhood may not be best preserved if images of the first type are to be mapped. Additionally, this method does not define mapping of colors outside the content color gamut that are still inside the source color gamut.

SUMMARY OF INVENTION

An aspect of present principles avoids and provides solutions to the aforementioned problems.

An aspect of present principles is directed to changing the hue of source colors towards the hue of target colors taking into account a first source color gamut, a second source color gamut (such as a content color gamut) and the target color gamut.

An aspect of present principles is directed to a method for gamut mapping colors from one of a first source color gamut or a second source color gamut towards a target color gamut. The method comprises accessing at least one first set of colors comprising an achromatic color, a specific color of the first source color gamut, a corresponding specific color of the second source color gamut and a corresponding specific color of the target color gamut; accessing at least one second set of colors comprising colors of a constant hue corresponding to the hue of the specific color of the target color gamut; and performing color gamut mapping of one of the colors of one of the first source color gamut or the second color gamut towards the target color gamut based on a difference of the hue of at least one color from the first set of colors and hue of at least one other color of the second set of colors, this other color having the same chroma as the at least one color from the first set. The specific colors are at least one selected from a group of primary colors, secondary colors, a group of primary colors and secondary colors. Indeed, a first specific color from a first color gamut corresponds to a second specific color from a second color gamut, if there is no other specific color of the second color gamut having a hue closer to the hue of the first specific color than the second specific color. Often, corresponding specific colors have the same color name, for example "red".

In a particular feature of the method, the first source color gamut, the second source color gamut and the target color gamut are in at least one color space having a lightness axis and a chromaticity plane, for instance a color space selected from the group of Lab color space and IPT color space, and performing color mapping of one of the colors comprises rotating the hue of the color towards the hue of a mapped color based on the hue difference. In another feature, performing color gamut mapping of one of said colors of the first source color gamut or the second source color gamut further comprises determining at least one color of at least one other of the first sets of colors and interpolating the hue of said color based the hue difference for the at least one color of the at least one of first set of colors and the hue difference for the at least one color of the at least one other of first set of colors.

An aspect of present principles is directed to a system for gamut mapping source colors from one of a first source color gamut or a second source color gamut towards a target color gamut. The system comprises a processor configured to access at least one first set of colors comprising an achromatic color, a specific color of the first source color gamut, a corresponding specific color of the second source color gamut and a corresponding specific color of the target color gamut; and to access at least one second set of colors comprising colors of a constant hue corresponding to the hue of the specific color of the target color gamut. The processor is further configured to perform color gamut mapping of one of the colors of one of a first source color gamut or a second source color gamut towards the target color gamut based on a difference of the hue of at least one color from the first set of colors and the hue of at least one other color of the second set of colors, this other color having a same chroma as the at least one color from the first set. The specific colors are at least one selected from a group of primary colors, secondary colors, a group of primary colors and secondary colors.

In a particular feature of the system wherein the first source color gamut, second source color gamut and the target color gamut are in at least one color space having a lightness axis and a chromaticity plane, for instance a color space selected from the group of Lab color space and IPT color space, the processor is further configured to perform color mapping of one of the colors by rotating the hue of said color towards the hue of a mapped color based on the hue difference. In another feature, the processor is further configured to perform color gamut mapping of one of the colors of the first source color gamut or the second source color gamut by determining at least one color of at least one other of the first sets of colors and interpolating the hue of the color based the hue difference for the at least one color of the at least one of first set of colors and the hue difference for the at least one color of the at least one other of first set of colors.

An aspect of present principles is directed to a non-transitory computer readable storage medium comprising a computer program including a set of instructions executable by a processor, the instructions comprising accessing at least one first set of colors comprising an achromatic color, a specific color of the first source color gamut, a corresponding specific color of the second source color gamut and a corresponding specific color of the target color gamut; accessing at least one second set of colors comprising colors of a constant hue corresponding to the hue of said specific color of the target color gamut; color gamut mapping of one of the colors of one of the first source color gamut or the second source content color gamut towards the target color gamut based on the difference of the hue of at least one one color from the first set of colors and the hue of at least one other color of the second set of colors, this other color having the same chroma as said at least one color from the first set of colors; wherein the specific colors are at least one selected from a group of primary colors, secondary colors, a group of primary colors and secondary colors.

In a particular feature of the non-transitory computer readable storage, a Look Up Table is determined, wherein the Look Up Table includes a mapping of input LUT colors to resulting LUT colors determined based on the color gamut mapping for the colors of the first source color gamut or second source color gamut towards the target color gamut based on the hue difference. In another particular feature, wherein the first source color gamut, the second source color gamut and the target color gamut are in at least one color space having a lightness axis and a chromaticity plane, for instance a color space selected from the group of Lab color space and IPT color space, performing color mapping of one of said colors comprises rotating the hue of said color towards the hue of a mapped color based on said hue difference.

An aspect of present principles is applicable to any device that is configured to include the feature of color gamut mapping, such as cameras, displays, transmission systems (e.g., converting between different color gamut mapping standards), professional encoders, professional decoders, set-top boxes, video player, video recorder, or video game consoles.

BRIEF DESCRIPTION OF DRAWINGS

The invention will be more clearly understood on reading the description which follows, given by way of non-limiting example and with reference to the appended figures in which.

DESCRIPTION OF EMBODIMENTS

Figure 1:
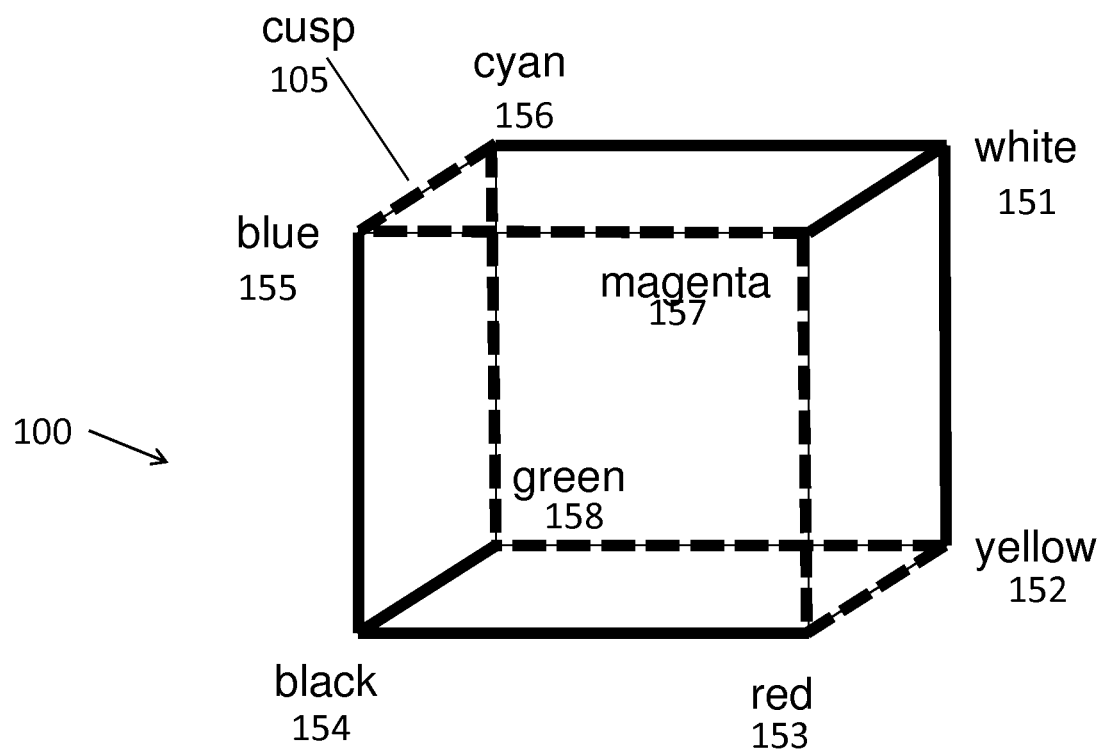
FIG. 1 illustrates an exemplary color gamut in the RGB color space.

Color gamut mapping includes a gamut boundary description (GBD). The GBD defines the boundary surface, or hull, of a color gamut in a color space. GBDs often comprise of explicit, generic 3D representations such as triangle meshes or volume models. For example, a GBD of a color gamut can be based on a mesh of triangles, each triangle being defined by its three vertices in the color space of this GBD. These vertices are colors located on the boundary of the color gamut.

Colors as well as GBD(s) are usually represented in a color space, although not necessarily in the same color space. A color space is a space where colors can be represented by color coordinates. A color space may correspond with a type of display or with an input source (e.g., a camera). The same color gamut can be represented in different color spaces (RGB, Lab, IPT . . . ). However a color gamut represented in different color spaces usually has a different shape in each of those different color spaces. A type of color space is a three-dimensional space that includes a lightness—L-axis, a chroma—C-axis, and a hue—h-axis. In some color spaces (such as Lab or IPT), hue may be defined as the angle around a central vertical axis of the cylindrical representation of the color space, chroma (i.e. saturation) may be defined as the distance from the axis and lightness as the distance along the axis.

The cusp of a color gamut is a set of colors, where each color has a larger chroma (i.e. saturation) compared to all other colors being in the same constant-hue leaf of a 3D color space and being within the color gamut. The constant-hue leaf expands along a lightness (L) axis and a chroma (C) axis. When a color gamut is described by a GBD based on discrete surface elements such as triangles, the cusp includes singular points (vertices) or lines (edges) on the boundary surface that limits a color gamut. For a color gamut of a trichromatic, additive display, the cusp usually includes the primary colors red, green, blue and the secondary colors yellow, magenta, cyan. The primary and secondary colors are in at least one of the color channels of the input of the display at either the minimum or at maximum levels. The cusp of a color gamut can be modeled using a gamut boundary description based on mesh of triangles where the cusp is a closed polygon based on vertices of some triangles. Cusp colors corresponding to these vertices are generally defined as the in-gamut color of maximum chroma in a given constant-hue leaf.

The cusp line of a color gamut is a line joining cusp colors. When the color gamut is represented in a color space having a measure for chroma (e.g., Lab color space or JCh color space according to the CIECAM-02 model defined by the CIE in 2002, or IPT color space as defined by Ebner Fritz and Mark D. Fairchild in their paper "Development and testing of a color space (IPT) with improved hue uniformity" published at the conference Color and Imaging Conference in 1998), a cusp color corresponds to the color of maximum chroma (i.e. maximum saturation) in a plane defined by a constant hue. The chroma (i.e. the saturation) of a color can be obtained from human observers using psycho-physical experiments. However different viewing conditions and/or different models can lead to different chroma (i.e. saturation) definitions. For example, in the Lab color space (respectively in the IPT color space), chroma (i.e. saturation) is defined to be the square root of the sum of the squares of a and b (respectively P and T). A plane defined by a constant hue is generally named "constant hue leaf". More generally, cusp colors often correspond to singular points ("vertices") or singular lines ("edges") on the boundary surface that limits a color gamut. The cusp line of a color gamut can be generally modeled as a line forming a closed polygon on the gamut boundary of this color gamut.

A color gamut mapping method (or gamut mapping algorithm) may map sourcecolors from a source color gamut (having its own source cusp points or source cusp line) to a target color gamut (having also its own target cusp points or destination cusp line) where the source colors are distributed with in a content color gamut (having its own source cusp points or source cusp line). The content color gamut is included in the source colors gamut. In order to take advantage of the range of colors in the target gamut, the gamut mapping method may map a source cusp point/line into the target cusp point/line. Such gamut mapping algorithms are known as cusp gamut mapping algorithms.

FIG. 1 illustrates an example of a color gamut 100 in the RGB color space. The color gamut 100 of FIG. 1 may be the color gamut of a trichromatic display or a trichromatic camera. The color gamut 100 corresponds to the cube (the inside and the surface) shown in FIG. 1.

As shown in FIG. 1, RGB color gamut 100 includes a cusp line 105. The cusp line 105 is the dotted line forming a closed polygon, corresponding to the set of lines linking the primary colors to the secondary colors. The cusp line 105 is composed of singular lines linking each primary color of the display (for example red 153, green 158 and blue 155) with a secondary color (for example yellow 152, magenta 157 and cyan 156) that has that primary color as a component. For example, the cusp line 105 may link colors as follows: red 153 with yellow 152, red 153 with magenta 157, green 158 with yellow 152, green 158 with cyan 156, blue 155 with cyan 156 and blue 155 with magenta 157. The cusp line 105 is shown by dotted lines in FIG. 1.

Figure 2:
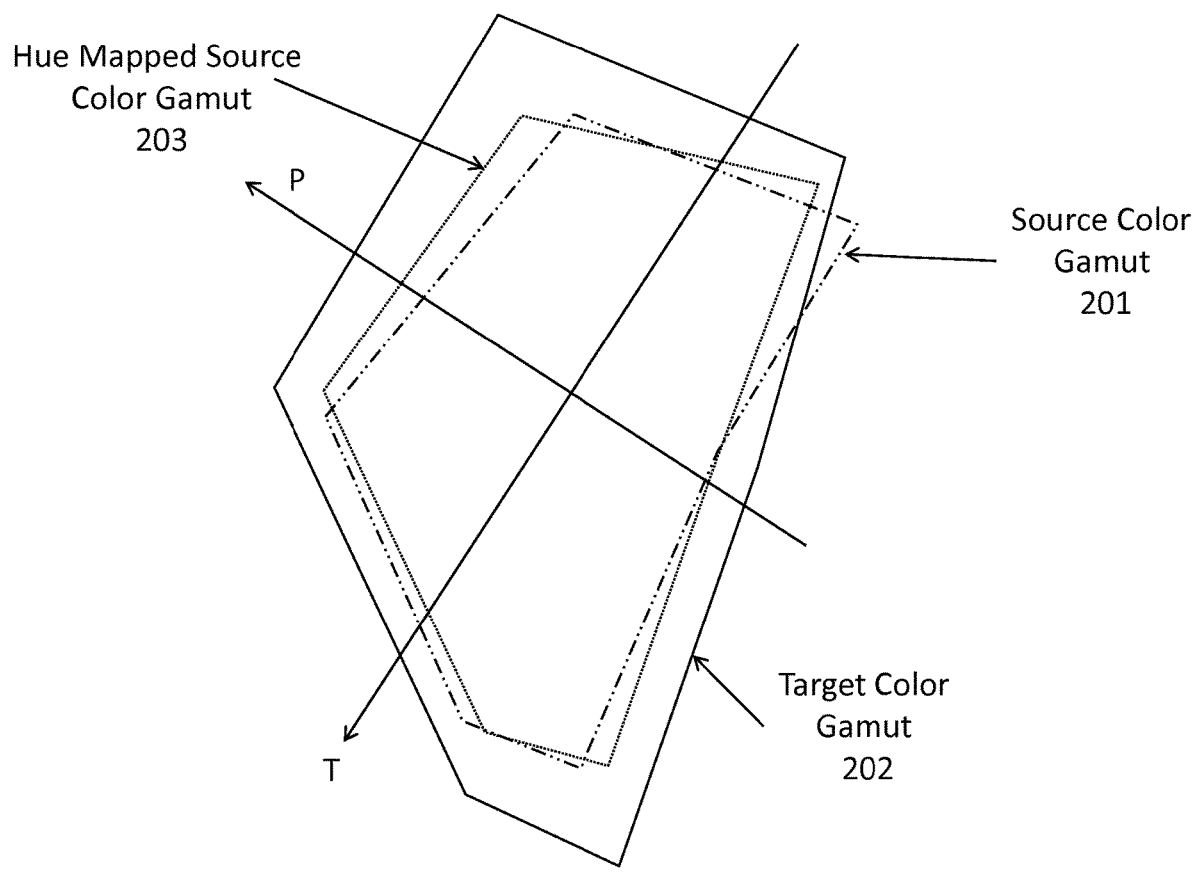
FIG. 2 illustrates an exemplary hue rotation mapping.

FIG. 2 illustrates an example of a hue rotation color gamut mapping in a PT-plane of the IPT color space. FIG. 2 includes the cusp of a source color gamut 201, generated by projecting the 3D cusp of the source color gamut into the PT-plane, the cusp of a target color gamut 202, generated by projecting the 3D cusp of the target color gamut into the PT-plane, and the cusp of a hue mapped source gamut 203 using full hue rotation, generated by projecting the 3D cusp of the hue mapped source color gamut into the PT-plane. The P and T axes are the two chromatic axis of the IPT color space. The hue mapped source gamut 203 is the result of aligning the hue of the primary and the secondary colors of the source color gamut 201 with the hue of the respective primary and the secondary colors of the target color gamut 202, thereby providing full hue rotation.

Figure 3A:
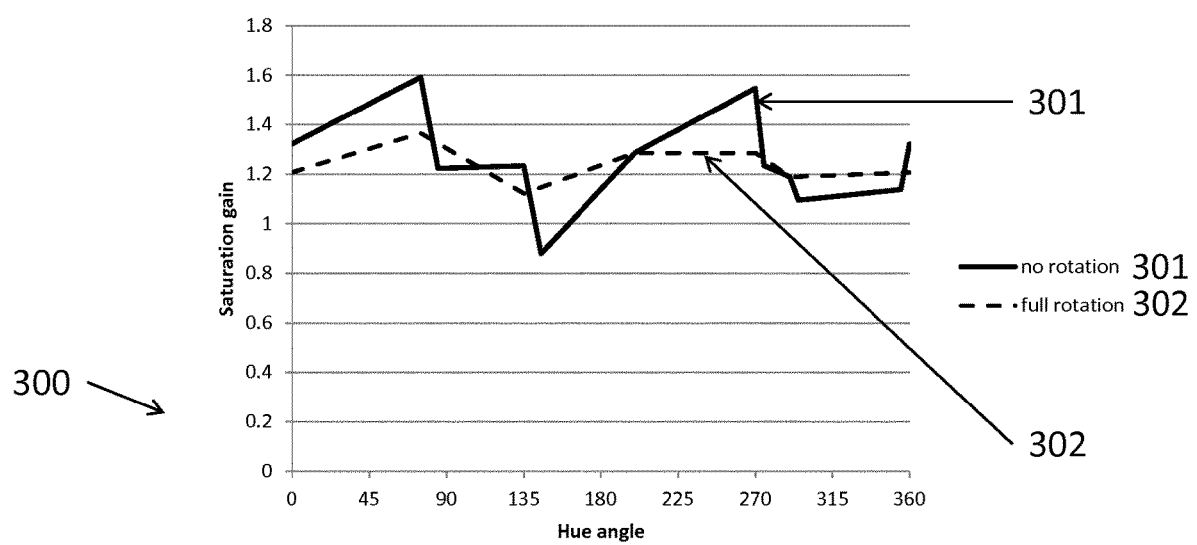
FIG. 3a illustrates an exemplary plot diagram of saturation gain.

FIG. 3a illustrates an exemplary plot diagram 300 illustrating the modification of saturation resulting from color gamut mapping using chroma compression or expansion with or without the full hue rotation. As used herein, the modification of saturation may be defined as a ratio of color saturation before and after color gamut mapping. For example when using chroma compression or expansion without hue rotation, the saturation ratio of the cusp points of the source color gamut may correspond to the ratio between the saturation of the cusp point in the source color gamut and the saturation of the cusp point having the same hue in the target color gamut.

The plot diagram 300 illustrates the modification of saturation that is induced by color gamut mapping using chroma compression. The vertical axis of the plot diagram 300 pertains to the saturation ratio. The horizontal axis of the plot diagram 300 pertains to hue angle measured in degrees. The plot diagram 300 includes a plot line 301 that demonstrates the saturation ratio versus hue angle when there is no hue rotation. Plot line 301 relates to mapping the source color gamut to the target color gamut (using a chroma compression without hue rotation). The plot diagram 300 further includes a plot line 302 that demonstrates the saturation ratio versus hue angle when there is a full hue rotation. Plot line 302 relates to mapping the source color gamut (using a gamut mapping with full hue rotation such as Henley) to the target color gamut.

Figure 3B:
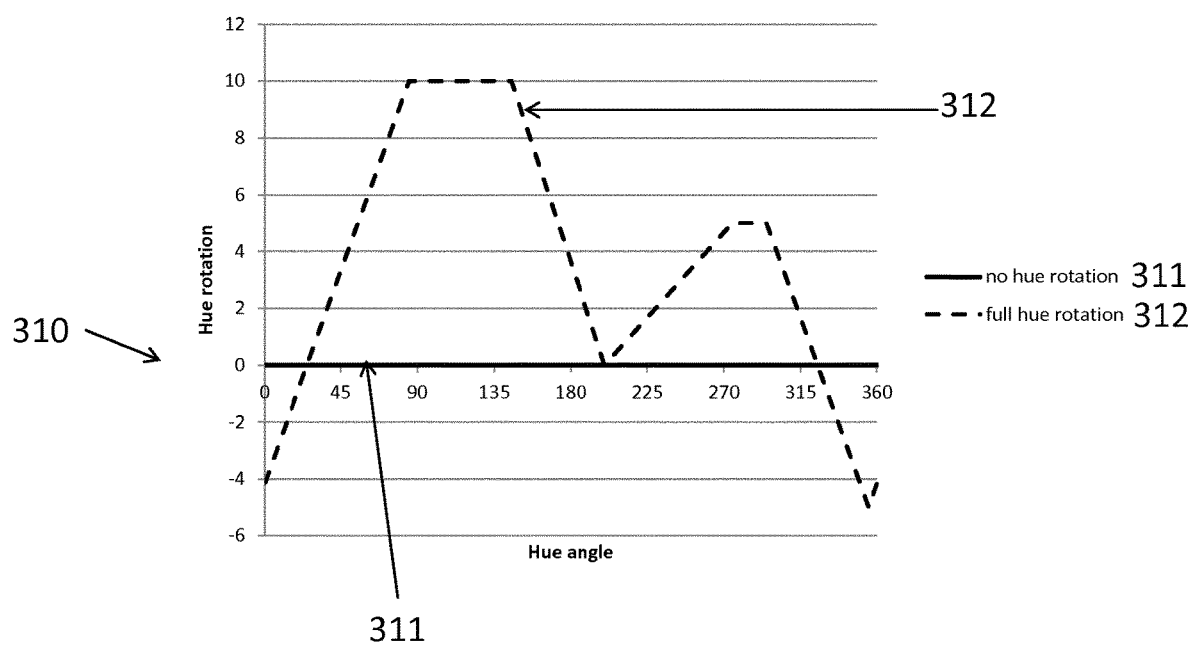
FIG. 3b illustrates an exemplary plot diagram of hue rotation.

FIG. 3b illustrates an exemplary plot diagram 310 of hue rotation resulting from a color gamut mapping with or without the full hue rotation. The plot diagram 310 illustrates the hue rotation (change of hue) that is induced by full hue rotation mapping of the source color gamut to the target color gamut. The vertical axis of the plot diagram 310 pertains to hue rotation angle in degrees. The horizontal axis of the plot diagram 310 pertains to hue angle in degrees. The plot diagram 310 includes a plot line 311 that demonstrates the hue rotation angle versus hue angle when there is no hue rotation. The plot diagram 310 further includes a plot line 312 that demonstrates the hue rotation angle versus hue angle when there is a full hue rotation. As shown in FIG. 3b, most of the colors get shifted by a large amount when there is full hue rotation. As can be seen from FIGS. 3a and 3b, while full hue rotation effectively improves the uniformity of the saturation ratio, full hue rotation also results in the colors getting shifted.

An aspect of present principles relates to mapping of the hue of colors of a first and second source color gamuts being for instance a source color gamut and a content color gamut.

An aspect of present principles is directed to hue mapping. An aspect of present principles is directed to mapping the source color gamut and the content color gamut towards, but not necessarily into, the target color gamut. For example, the hue of the colors in the source color gamut or the content color gamut may be modified such that the resulting hue mapped source color gamut and the resulting hue mapped content color gamut are closer to the target color gamut. However, after the hue mapping, some colors of the hue mapped content color gamut might still lie outside of the target color gamut and/or the target color gamut might not be completely covered by the hue mapped content color gamut. In the same way, after the hue mapping, some colors of the hue mapped source color gamut might still lie outside of the target color gamut and/or the target color gamut might not be completely covered by the hue mapped source color gamut. The hue mapped colors may then need to be further mapped towards the target color gamut so that all hue mapped colors lie inside the target color gamut and/or the target color gamut is completely covered by the hue mapped colors.

Figure 4A:
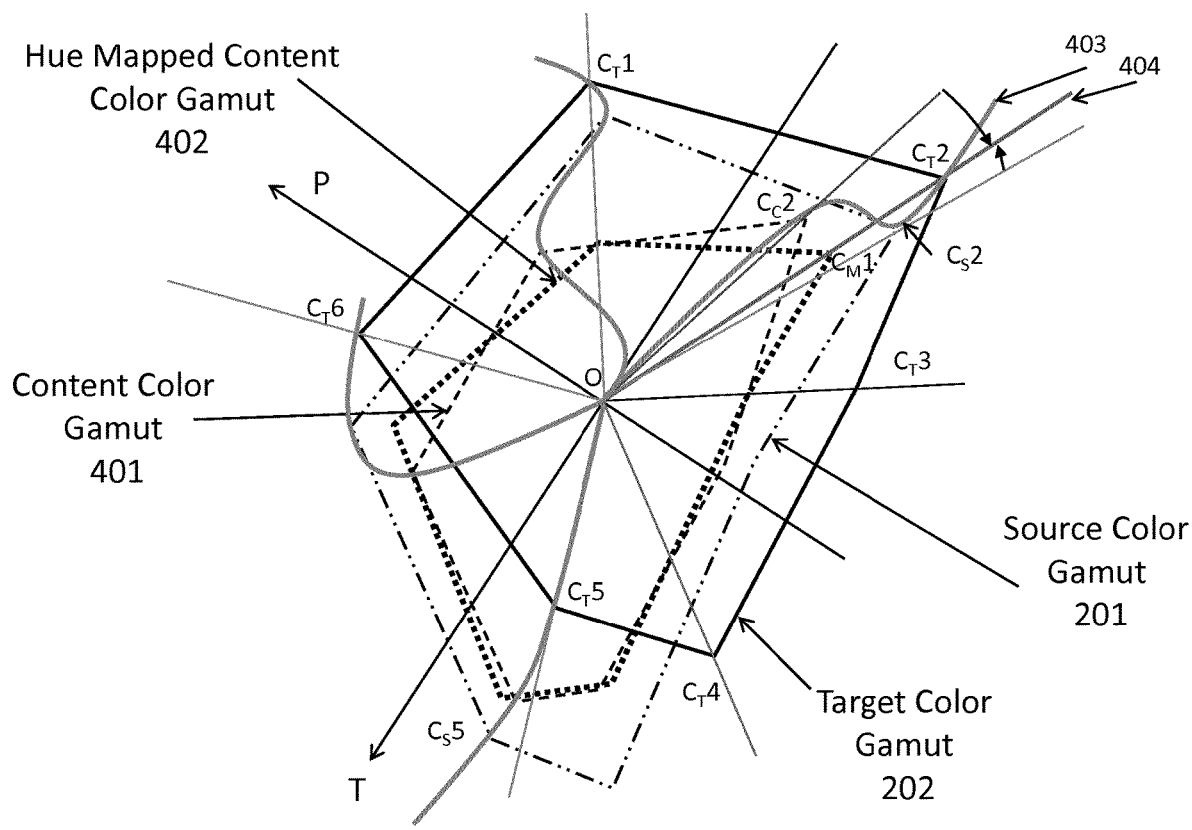
FIG. 4a illustrates an exemplary color gamut mapping in accordance with present principles.

FIG. 4a illustrates an example of a hue rotation color gamut mapping in a PT-plane of the IPT color space. FIG. 4a includes the cusp of a source color gamut 201, the cusp of a target color gamut 202, the cusp of a content color gamut 401 and the cusp of a hue mapped content color gamut 402 using full hue rotation. The hue mapped content gamut 402 is the result of aligning the hue of the primary and the secondary colors ($C_C2$) of the content color gamut 401 with the hue of the respective primary and the secondary colors ($C_T2$) of the target color gamut 202, thereby providing full hue rotation. As shown on FIG. 4a, if content color gamut 201 is smaller than source color gamut 401, the target color gamut may expose less chroma than content color gamut 201 and than source color gamut 401 for some hues (around $C_T2$) while having colors with larger chroma for other hues (around $C_T5$). Indeed any gamut mapping is compatible with the hue mapping of the present principles.

In one example of present principles, the hue mapping may exclude or may include other mapping processes, such as cusp color gamut mapping. In one example, gamut mapping with chroma compression or expansion is applied after hue mapping, thereby minimizing color neighborhood degradation.

An aspect of present principles is a method for color gamut mapping such that the source color gamut is changed or modified towards the target color gamut and at the same time the content color gamut is changed or modified towards the target color gamut. An aspect of present principles is directed to hue mapping based on mapping of the hue of primary and secondary colors of both the source and the content gamuts towards the hue of the corresponding primary and secondary colors of the target color gamut. This mapping or modification might include a complete hue mapping—similar to the known CARISMA algorithm—of primary or secondary colors of the source or of the content gamut towards the corresponding primary or secondary colors of the target color gamut such that the hue of the mapped primary or secondary colors is identical to the hue of the corresponding primary or secondary colors of the target color gamut. This mapping or modification might include also an adaptive hue mapping—similar to the known method from WO2016206981—of primary or secondary colors of the source or of the content gamut towards the corresponding primary or secondary colors of the target color gamut such that the hue of the mapped primary or secondary colors is closer to the hue of the corresponding primary or secondary colors of the target color gamut than before mapping.

As used herein, primary ($C_T1$, $C_T3$, $C_T5$) or secondary ($C_T2$, $C_T4$, $C_T6$) "corresponding" colors of a target color gamut correspond to the primary or secondary color (only $C_S2$ is represented) of the source color gamut and to the primary or secondary color (only $C_C2$ is represented) of the content color gamut. For example, the 'red' color of the target color gamut is the target color corresponding to the 'red' of the source color gamut and to the 'red' of the content color gamut. These three different 'reds' are corresponding specific colors. Alternatively, the corresponding colors of a target color gamut can refer to the specific color of the target color gamut with the closest hue to the specific colors of the source and content color gamuts.

An aspect of present principles is directed to a hue mapping in a color space, this color space being characterized in that the hue of a color is represented by a cylindrical angle, the lightness of a color by the coordinate on the longitudinal axis of the cylindrical coordinate representation of the color space and the chroma by the distance of the color to the longitudinal axis. The lightness axis (O) corresponds to the achromatic color. The hue mapping includes a rotation of the cusp points of the source and content color gamuts around the lightness axis. The colors may be rotated in the ab plane in Lab color space or PT space in IPT color space as shown on FIG. 4a. The rotation may then be applied to modify source colors represented in any other color space (e.g., RGB, YUV).

Figure 4B:
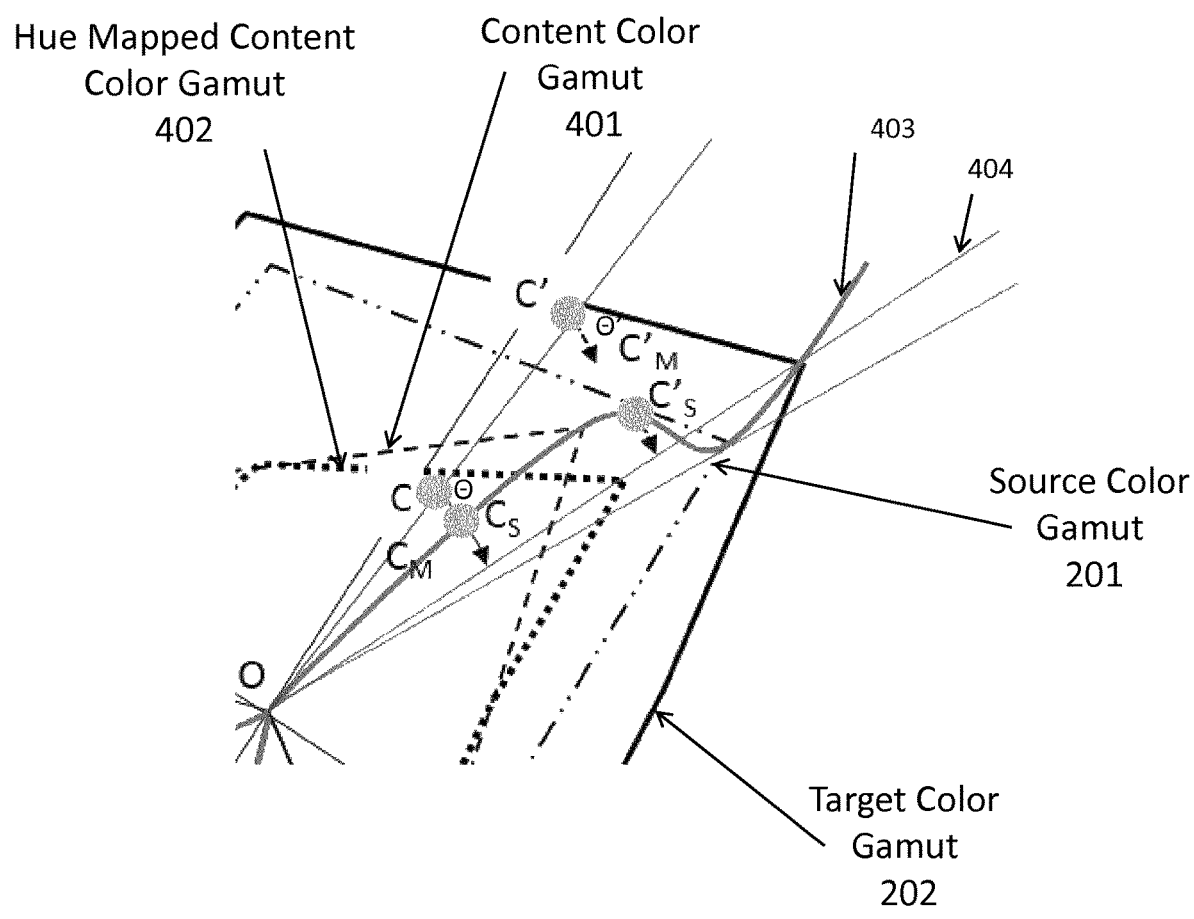
FIG. 4b illustrates an exemplary portion of a hue rotation mapping in accordance with present principles.

An aspect of present principles is that two colors within the same hue leaf are hue mapped in different manners. According to a salient feature of the present principles, the hue mapping of colors of a same hue leaf depend on the chroma of colors. This is different from known methods such as CARISMA and WO2016206981 where the rotation of a cusp point of a hue leaf defines a rotation of all colors of the hue leaf. In one example, the angle of rotation further varies with the hue. FIG. 4b illustrates an exemplary portion of a hue rotation mapping in accordance with present principles. The colors C and C' of the source color gamut have the same hue and thus are part of a same hue leaf. Each of the colors C and C' are hue mapped in accordance with present principles based on the hue difference of one color on the first set of colors (403) namely $C_S$ or $C'_S$, respectively, and the second set of colors (404). For example, a hue rotation angle can be defined for each of C and C' having the same value as the mentioned hue difference of $C_S$ or $C'_S$, respectively. Since the hue differences of $C_S$ and $C'_S$ are generally not the same, the hue rotation angle of C and C' are generally distinct.

An aspect of present principles is directed to a method for mapping, in a color space, colors of a source color gamut towards colors of a target color gamut, where hue, saturation and lightness can either be directly represented by a coordinate of the color space or obtained from the coordinates of the color space.

Hue rotation for colors other than colors of a first set of colors may be determined based on hue rotation angles determined for the colors of at least one first set of colors. For example, hue rotation angles for a such other color can be obtained by interpolation of the hue rotation angles of the colors of at least one first set of colors having the same or close chroma. Alternatively, hue rotation angles may be obtained by interpolation of the hue rotation angles of the colors of at least one first set of colors having the same or close lightness.

An aspect of present principles allows for an improvement in uniformity of the saturation gain induced by color gamut mapping, while accounting for potential hue modifications. An aspect of present principles relates to a method that improves the uniformity of the saturation gain not only of colors distributed all over the source color gamut but also the saturation gain of colors distributed all over the content color gamut. An aspect of present principles relates to a method that not only improves the uniformity of the saturation gain—thereby minimizing the color neighborhood degradation—but also minimizes the average change of hue. An aspect of present principles is directed to the preservation of the color neighborhood, which includes maintaining the spatial uniformity in color space of features of the content colors (e.g., lightness, chroma or hue) after mapping towards the target color gamut. In one example, an aspect of present principles is directed to hue rotation angles smaller than the full hue rotation angle.

In one example, the range of hue rotation is between a minimum rotation and a maximum rotation where the minimum is 0—no rotation—and the maximum is the hue angle difference between the specific colors in the source color or content color gamut and the corresponding specific colors in the target color gamut (alignment of the source primary color hue to the hue of the target primary color).

In another example, the range of hue rotation is between a minimum rotation and a maximum rotation where the minimum is the negative hue angle difference between the specific color in the source color gamut and the corresponding specific colors in the target color gamut (alignment of the source primary or secondary color $C_S2$ hue to the hue of the target primary or secondary color $C_T2$) and the maximum is the positive hue angle difference between the specific color in the content color gamut and the corresponding specific colors in the target color gamut (alignment of the content primary or secondary color $C_C2$ hue to the hue of the target primary or secondary color $C_T2$).

In another example, the range of hue rotation is between a minimum rotation and a maximum rotation where the minimum is the negative hue angle difference between the specific color in the content color gamut and the corresponding specific colors in the target color gamut (alignment of the content primary color hue to the hue of the target primary color) and the maximum is the positive hue angle difference between the specific color in the source color gamut and the corresponding specific colors in the target color gamut (alignment of the source primary color hue to the hue of the target primary color). This example is shown in FIG. 4a for the specific target color $C_T1$.

In another example, the range of hue rotation is between a minimum rotation and a maximum rotation where the minimum is the negative hue angle difference between the specific color in the source or content color gamut and the corresponding specific colors in the target color gamut (alignment of the source or content primary color hue, respectively, to the hue of the target primary color as for $C_T3$, $C_T4$ $C_T5$) and the maximum is 0 corresponding to no rotation.

The method can be applied to the primary colors only or advantageously to the primary and the secondary colors. The other colors of the source gamut are also rotated using an interpolation of the hue rotation angles of the neighboring primary (and advantageously the secondary) colors in the simplest implementation, the rotation angle for colors of same chroma is a piecewise linear function of hue. In one example, the method is applied to the 2D projection of the 3D cusp on the chroma plane (ab plane in Lab space, PT plane in IPT space). However it may be possible to apply this, without modification, to the 3D cusp using angles measured in the 3D color space. In this particular case, the hue change might depend on third coordinate (i.e. the lightness, the intensity or the luminance). In one other example, two neighboring specific color (for example for $C_T1$, $C_T2$) of color (C or C') and interpolating the rotating hue of the color (C or C') based on the hue difference for each of the two neighboring specific color. Advantageously, the rotation angle for color C of same chroma is a linear function of hue applied to the hue difference for each of the two neighboring specific colors ($C_T1$, $C_T2$).

In one example, advantages of present principles include the ability to optimize the mapping at the same time to the source color gamut and to the content color gamut. Another advantage includes the ability to preserve artistic intent as moderate hue shift is applied in most cases, and maximum hue shift is only applied when needed. Another advantage includes preservation of color neighborhood increasing the uniformity of the saturation gain of a cusp gamut mapping at the same time for two types of source color distributions, the first distribution using the whole source color gamut, the second only using the content color gamut.

Figure 5:
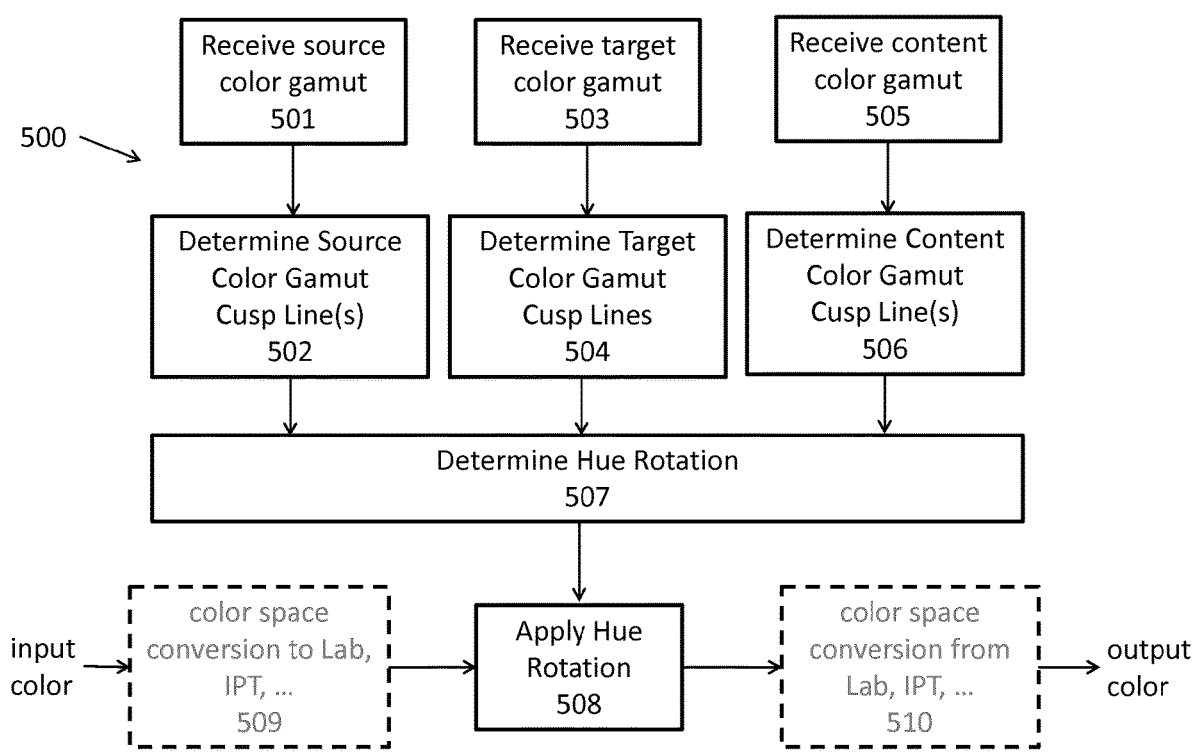
FIG. 5 illustrates an exemplary method in accordance with present principles.

FIG. 5 illustrates a flow diagram illustrating a method 500 for hue mapping in accordance with present principles. In one example, method 500 is directed to performing hue rotation mapping of both a source color gamut and a content color gamut towards a target color gamut. Method 500 may include changing the hue of the colors of the source color gamut.

Method 500 may include a block 501 for receiving information regarding a source color gamut. Block 501 may receive source color gamut information, e.g., information identifying the entire color gamut. In another example, block 501 may receive an identifier that identifies stored color gamut information (e.g., an indicator that identifies pre-stored color gamut information). The received source color gamut information may be information that identifies the source color gamut. The source color gamut could be limited to the coordinates of primary colors, secondary colors, the achromatic point, gamut boundary description, coordinates of some colors, the cusp line, cusp points, etc. The source color gamut can be represented in any defined color space (e.g., RGB, XYZ, Lab, and IPT). The source color gamut may be received from any source (e.g., from a device delivering the input content, such as a camera, a set top box, a camera sensor, a HDMI receiver, a communication interface, a mobile network (including 3G or 4G network), a wireless network (including Wi-Fi, Bluetooth network or links), a TV Broadcast network (e.g. DVB or ATSC receiver interface), a wired network (including web network), a wired link or bus (including HMDI, USB), an optical disk player (including DVD or Blu-Ray player, a video stream or a storage medium (e.g. a Blu-Ray Disk, a memory)). The source color gamut may alternatively or in addition be compliant with a standard (e.g. rec.709, rec.2020)).

Block 502 may determine the cusp line of the received source color gamut. Block 502 may determine each cusp point for each hue. In one example, block 502 may determine, for each hue, the color with the maximum saturation. Block 502 may represent the cusp line as a saturation per hue. In another example, block 502 may represent the cusp line based on 3D coordinates of the cusp points.

Method 500 may further include a block 503 for receiving information regarding a target color gamut. Block 503 may receive target color gamut information, e.g., information identifying the entire color gamut. In another example, block 503 may receive an identifier that identifies stored color gamut information (e.g., an indicator that identifies pre-stored color gamut information). The received target color gamut information may be information that identifies the target color gamut. The target color gamut could be limited to the coordinates of primary colors, secondary colors, the achromatic point, gamut boundary description, coordinates of some colors, the cusp line, cusp points, etc. The target color gamut can be represented in any defined color space (e.g., RGB, XYZ, Lab, and IPT). The target color gamut may be transmitted from any device/system (e.g., from a device that will display the content such as a television, a monitor, a smartphone, a tablet, a laptop, a gaming interface, or any other type of display, a communication interface, a destination interface, or a communication link (e.g. Wi-Fi, USB) or wired Link (e.g. HDMI, local area network)). The target color gamut may alternatively or in addition be a color gamut that is compliant with a standard (e.g. rec.709, rec.2020)). The target color gamut may be transmitted and/or received via a destination interface, e.g. an interface with a display or a communication link (including wireless (e.g. Wi-Fi, USB) or wired Link (e.g. HDMI, local area network).

In one example, the color space of the target color gamut may be different than the color space of the source color gamut. In one example, the target color gamut information may be received from a different device/system than the source color gamut information. For example, source images with source colors from a system using RGB color space according to BT.2020 are to be mapped to target colors in target images for a system using RGB color space according to BT.709.

Block 504 may determine the cusp line(s) of the target color gamut. Block 504 may determine the cusp line in accordance with principles described in connection with block 502.

Method 500 may further include a block 505 for receiving information regarding a content color gamut. Block 505 may receive content color gamut information, e.g., information identifying the entire color gamut. In another example, block 505 may receive an identifier that identifies stored color gamut information (e.g., an indicator that identifies pre-stored color gamut information). The received content color gamut information may be information that identifies the content color gamut. The content color gamut could be limited to the coordinates of primary colors, secondary colors, the white point, gamut boundary description, coordinates of some colors, the cusp line, cusp points, etc. The content color gamut can be represented in any defined color space (e.g., RGB, XYZ, Lab, and IPT). The content color gamut may be transmitted from any device/system (e.g., from a device that will display the content such as a television, a monitor, a smartphone, a tablet, a laptop, a gaming interface, or any other type of display, a communication interface, a destination interface, or a communication link (e.g. Wi-Fi, USB) or wired Link (e.g. HDMI, local area network)). The content color gamut may alternatively or in addition be a color gamut that is compliant with a standard (e.g. rec.709, rec.2020)). The content color gamut may be transmitted and/or received via a destination interface, e.g. an interface with a display or a communication link (including wireless (e.g. Wi-Fi, USB) or wired Link (e.g. HDMI, local area network).

In one example, the color space of the content color gamut may be different than the color space of the source color gamut. In one example, the content color gamut information may be received from a different device/system than the source color gamut information.

Block 506 may determine the cusp line(s) of the content color gamut. Block 506 may determine the cusp line in accordance with principles described in connection with block 502.

Block 507 may determine hue rotation angles. In one example block 507 may determine hue rotation angles based on primary colors. In another example, block 507 may determine hue rotation angles based on secondary colors. In one example of present principles, block 507 may determine hue rotation angles based on only primary colors. In another example of present principles, block 507 may determine hue rotation angles based on only secondary colors. In another example, block 507 may determine hue rotation angles based on both primary and secondary colors.

Block 507 may determine hue changes for each source color, and in particular for each specific color (i.e., primary and/or secondary color). As used herein, "specific colors" are defined as primary color(s), secondary color(s) or primary and secondary colors of a color gamut. Block 507 may determine hue changes of the specific colors of the source color gamut in the direction of the hue of the corresponding primary and/or the secondary color of the target color gamut. In one example, block 507 may determine hue changes by determining hue rotations that are defined by rotation angles.

In one example block 507 can determine hue changes, i.e., a hue rotation angle, for any hue, including hues of non-specific colors. In one example, block 507 may determine the hue rotation angle based on interpolation (e.g., linear, splines) of the hue rotation angles obtained for the primary and/or the secondary colors. In one example, the angle of rotation of colors other than specific colors may be determined by linear interpolation of the angle of rotation of the specific colors surrounding (i.e adjacent to) the hue angle of said specific colors in the source color gamut. Other interpolation methods could be used (e.g. spline interpolation). In one example, block 507 may perform such principles.

In another example, non-specific colors (colors other than primary and/or secondary colors) of the source color gamut may be rotated using a linear interpolation of the hue rotation angles of the adjacent primary (and optionally also the secondary) colors in the source color gamut. The hue rotation angle may be a piecewise linear function of hue. In one example, block 507 may perform this example.

In one example, block 507 may determine a look-up table ("LUT") for mapping input colors (e.g., colors from input images/video) to output colors (e.g., output images/video).

Block 507 may determine hue rotation angles for the primary and/or the secondary colors in accordance with the principles described in connection with steps 1-4 described hereafter.

Block 508 may apply hue rotation based on the determinations of block 507. In one example, block 508 may apply hue rotation based on the hue rotation angles from block 507. In one example, block 508 may generate a LUT based on applying the hue rotation determinations from block 507 to each input color to determine an output color. In another example, block 508 may apply hue rotation based on an LUT that was previously determined in accordance with present principles, including the hue rotation determinations of block 507. Once an LUT is generated in accordance with present principles, it may be stored for future application without performing the determinations of blocks 501-507. The LUT may be generated in accordance with the principles described in connection with blocks 501-507 and steps 1-4.

Block 508 may receive input color information. The input color information may be color information of input pixels of the input video. In one example, block 508 may determine an output color that is determined based on the rotated hue. Block 508 may then provide the output color.

In one example, blocks 509 and 510 may apply color space conversion to input or output color (e.g., pixels). The color conversion may be performed in the same step or the same process as the hue rotation. The color space conversion may change the representation of a color from a first color space to another color space. In one example, blocks 509 and 510 may be optional. In one example, blocks 509 and 510 may apply color space conversion based on color space representation of an LUT. In another example, blocks 509 and 510 may apply color space conversion based on the color space used to perform the hue rotation. Method 500 discusses an example of performing aspects of present principles in a color space such as Lab or IPT. In such color space, the modification of hue corresponds to a rotation of colors.

Method 500 may be modified for other implementations, such as implementations utilizing LUTs that modify the hue. For example if method 500 is modified to utilize LUTs, block 508 may implement the LUT. In this example, blocks 501-507 may not be utilized or may be utilized to generate the LUT.

Figure 8:
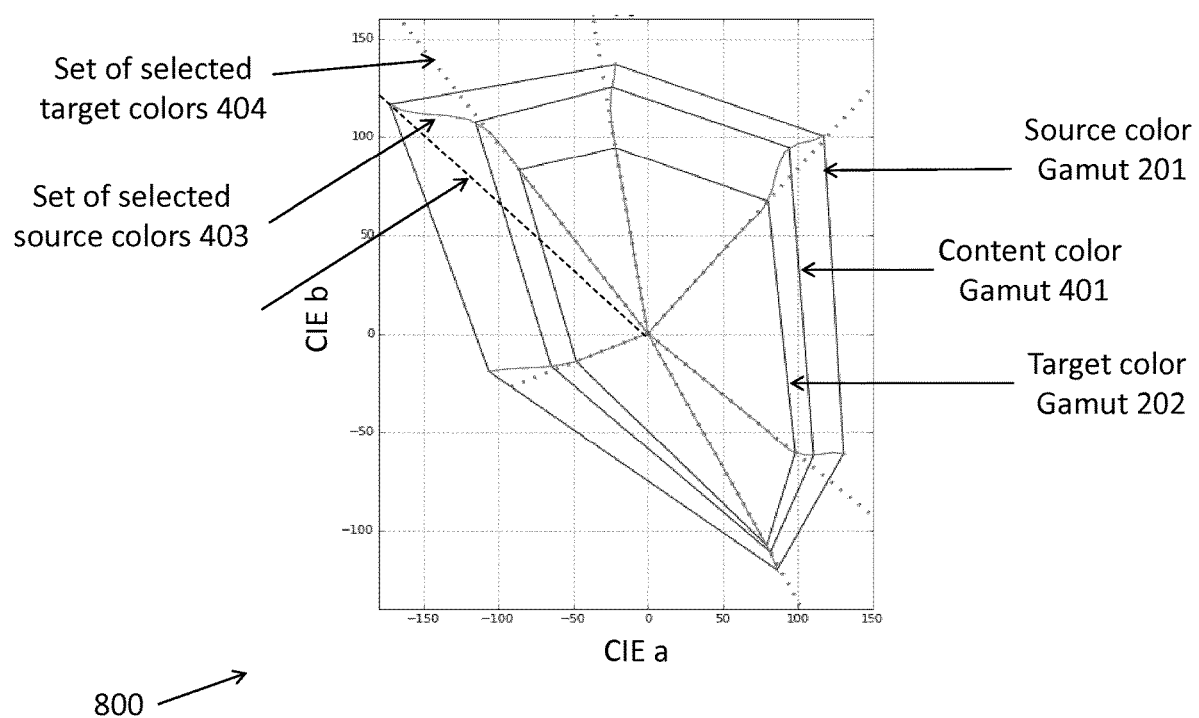
FIG. 8 illustrates another exemplary color gamut mapping in accordance with present principles.

FIG. 8 illustrates an exemplary plot diagram 800 of a source color gamut 201, a content color gamut 401 and a target color gamut 202 at a certain lightness level in the ab-plane of CIELAB color space.

In one example, block 507 of FIG. 5 may determine hue rotation angles for the primary and/or the secondary colors in the following way. The hue rotation angle for the primary or secondary color of the source color gamut is determined such that after hue mapping the hue of the mapped primary or secondary color of the source color gamut is identical to the hue of the corresponding primary of secondary color of the target color gamut (alignment of the source primary or secondary color hue to the hue of the target primary or secondary color). The hue rotation angle for the corresponding primary or secondary color of the content color gamut is determined such that after hue mapping the hue of the mapped primary or secondary color of the content color gamut is identical to the hue of the corresponding primary of secondary color of the target color gamut (alignment of the content primary or secondary color hue to the hue of the target primary or secondary color).

In another example, block 507 of FIG. 5 may determine hue rotation angles for a first set of selected source colors in the following way. The set of selected colors 403 is defined by a curve going through the white (i.e origin of the ab plane or lightness axis) and through all three corresponding primary or secondary colors of the source, content and target color gamuts, respectively (such as $C_S2$, $C_C2$, $C_T2$). Such curve corresponds to a first continuous set of selected colors. According to a variant, only a first discrete set of colors of the continuous set of selected colors of the curve are used. In a non-limiting example, the first discrete set of colors comprises 10 color samples. Such variant is particularly well adapted to reduce processing power for implementing the method. In one example, the curve a piecewise strait line. In one other example, the curve a spline. The hue rotation for this set of selected source colors is defined such that after hue rotation the mapped set of selected source colors is identical to the set of selected target colors 404. The set of selected target colors 404 is defined by a curve going through the white (i.e origin of the ab plane or lightness axis or achromatic color) and the corresponding primary or secondary color of the target color gamut. Such curve 404 corresponds to a second continuous set of selected colors. Advantageously, this curve 404 is a straight line corresponding to a constant hue or a same hue leaf. As for the first set of colors, the second set of colors might be discrete. Such strait line limits the artifacts when chroma is compressed in a further chroma mapping step of a gamut mapping method.

In total, six sets of selected source colors 403 are mapped to corresponding six sets of selected target colors 404 for all six primary and secondary colors 'red, 'green', 'blue, 'cyan', 'magenta' and 'yellow'. In this example, the hue rotation angle depends on the chroma. One source color of the set of selected source colors is a source color gamut primary or secondary color that is mapped to the corresponding primary or secondary color (alignment of the source primary or secondary color hue to the hue of the target primary or secondary color). One source color of the set of selected source colors is a content color gamut primary or secondary color that is mapped to the corresponding primary or secondary color (alignment of the content primary or secondary color hue to the hue of the target primary or secondary color). The hue rotation angles of the primary or secondary colors of the source and content color gamuts, respectively, are different if the hues of the primary or secondary colors of the source and content color gamuts, respectively, are different.

In one example of present principles, the set of selected source colors 403 is not passing through target color.

In one example of present principles, a hue rotation angle ($\theta$) may be determined as follows. The following example may be implemented by block 507 of FIG. 5. The following steps are applied:
1. For source sample colors and corresponding content and target sample colors, access a first set of colors (801) comprising an achromatic color, the specific color of the source color gamut, a corresponding specific color of the content color gamut and a corresponding specific color of the target color gamut. In one example, a curve (403) going through the origin and the three specific colors is created in block 507 or is recovered from information on the color gamuts. The colors of this curve are called set of selected source colors or first continuous set of colors.
2. For source sample colors and corresponding content and target sample colors, access a second set of colors (404) comprising colors of a constant hue corresponding to hue of the specific color of the target color gamut. In one example, a curve (404) going through origin and the specific target color is created or is recovered from information on the color gamuts. The curve is different from the curve (403) of step 1. The colors of this curve are called set of selected target colors or second set of colors.
3. In preliminary step of step 4, a hue difference is computed between a first sample color from the first set of colors (403) towards the second set of colors (404). The hue difference corresponds to a hue rotation angle for the first sample color of the first set of colors (403) such that when any sample color from the first set of colors is rotated by this hue rotation angle, the mapped sample color of the first set of colors will coincide with a color of the second set of colors (404). Such hue differences for selected specific colors may be stored in a LUT for latter use in step 4.
4. For any given color of one of a source color gamut or a content color gamut, performing color gamut mapping towards the target color gamut is based the hue differences of sample colors having a same chroma as the given color and computed in step 3. In one example, a hue rotation angle ($\theta$) is computed by interpolation of the hue rotation angles calculated in step 3, for instance of 2 neighboring sample colors.

A first continuous set of colors corresponding to a source specific color $C_S$, to a target specific color $C_T$ and to a content specific color $C_C$ according to step 1 can be constructed for example using key points defining a cubic splines curve in the following manner:

A set of key points in color space is defined containing:
- One point corresponding to the specific color $C_S$ of the source color gamut,
- One point corresponding to the specific color $C_T$ of the target color gamut,
- One point corresponding to the specific color $C_C$ of the content color gamut,
- One preservation point $C_P$ for not modifying the hue at low chroma which is on the line between a first anchor point $C_{A1}$ on the lightness axis and the specific color $C_T$ of the target color gamut at 20% distance from the first anchor point: $C_P=C_{A1}+0.2(C_T-C_{A1})$, where the anchor point $C_{A1}$ has same lightness as $C_T$ but the chromatic coordinates are zero. In CIELAB space, if $C_T=(L_T, a_T, b_T)$, the first anchor point is $C_{A1}=(L_T, 0,0)$ and the preservation point is $C_P=(L_T, 0.2\ a_T, 0.2\ b_T)$. Another first anchor point could be chosen according to artistic intent of color preservation, for example $C_{A1}=(50,0,0)$ which is an anchor point at half maximum lightness on the lightness axis. This preservation point guides the cubic splines curve to colors of same hue as $C_T$ for lower chroma within 20% of the target color gamut. The percentage of 20% can be increased, for example 25%, or reduced, for example 15%, depending on the artistic intent of hue preservation for low chroma.
- One extrapolation point $C_E$ having a larger chroma than all of the three specific colors of source, target and content gamuts. If for example—such as shown in FIG. 4a for $C_S5$—the specific color $C_S5$ has a larger chroma than the corresponding specific colors of the target and content gamuts, the extrapolation point is chosen to be $C_E=C_S5+0.2(C_S5-C_{A2})$, where the second anchor point $C_{A2}$ has same lightness as $C_S5$ but the chromatic coordinates are zero. In CIELAB space, if $C_S5=(L_S, a_S, b_S)$, the second anchor point is $C_{A2}=(L_S, 0, 0)$ and the extrapolation point is $C_E=(L_S, 1.2\ a_S, 1.2\ b_S)$. Another second anchor point could be chosen according to artistic intent of color extrapolation, for example $C_{A2}=(50,0,0)$ which is an anchor point at half maximum lightness on the lightness axis. The extrapolation point guides the cubic splines curve to colors of same hue as $C_S5$ for large chroma beyond the largest color gamut. The factor of 0.2 can be increased, for example 0.3, or reduced, for example 0.1, depending on the artistic intent of mapping behaviour for large chroma.

The key points $\{C_T, C_S, C_C, C_P, C_E\}$ are associated with the corresponding chroma values $\{c_T, c_S, c_C, c_P, c_E\}$ where in CIELAB space holds $c_T=\sqrt{a_T^2+b_T^2}$ and correspondingly for $c_S, c_C, c_P, c_E$.

Three cubic splines curves $f_L(c), f_a(c), f_b(c)$ are calculated using known methods, for example the method "interp1d" from the module "interpolate" of the Python library "scipy", where The first curve $f_L(c)$ is calculated from the lightness values $\{L_T, L_S, L_C, L_P, L_E\}$ of the key points $\{C_T, C_S, C_C, C_P, C_E\}$ and the corresponding chroma values $\{c_T, c_S, c_C, c_P, c_E\}$;

The second curve $f_a(c)$ is calculated from the a coordinate values $\{a_T, a_S, a_C, a_P, a_E\}$ of the key points $\{C_T, C_S, C_C, C_P, C_E\}$ and the corresponding chroma values $\{c_T, c_S, c_C, c_P, c_E\}$;

The third curve $f_b(c)$ is calculated from the b coordinate values $\{b_T, b_S, b_C, b_P, b_E\}$ of the key points $\{C_T, C_S, C_C, C_P, C_E\}$ and the corresponding chroma values $\{c_T, c_S, c_C, c_P, c_E\}$.

The first continuous set of colors is than given by $\{(L,a,b)/L=f_L(c), a=f_a(c), b=f_b(c), 0<c<c_{max}\}$ where $c_{max}$ is the chroma of the specific color among corresponding specific colors for source, target and content gamuts having the largest chroma. For example, for the first continuous set of colors for the specific color $C_S 5$, $c_{max}$ is the chroma of $C_S 5$.

In step 3 above, the hue rotation angles may be calculated for a set of N sample colors out of the first continuous set of colors, for example $\{(L_i,a_i,b_i)/L_i=f_L(c_i), a_i=f_a(c_i), b_i=f_b(c_i), c_i=c_{max}i/N, 0\leq i<N-1\}$. If $C_T=(L_T, a_T, b_T)$ is the corresponding specific color of the target color gamut, the rotation angles are the angles between the vectors $\{(a_i,b_i)\}$ and the vector $\{(a_T,b_T)\}$ in the ab-plane of CIELAB space. The resulting rotation angles $\{\alpha_i=\text{angle}((a_i,b_i), (a_T,b_T))/0\leq i<N-1\}$ can form a Look Up Table (LUT) $\{(L_i,a_i,b_i,\alpha_i)/0\leq i<N-1\}$ indicating for a color $\{(L_i,a_i,b_i)$ in color space the corresponding rotation angle $\alpha_i$ to be applied in order to hue map the color. Such a LUT can be created for each first continuous set of colors of all specific colors of the source color gamut and all these LUTs can be combined into a global LUT, for example $\{(L_i,a_i,b_i,\alpha_i)/0\leq i<6\,N-1\}$ supposing three primary and three secondary colors to be the specific colors of the source color gamut.

In step 4 above, in order to hue map any given color of one of a source color gamut or a content color gamut, a hue rotation angle ($\theta$) can computed by interpolation of the entries of the global LUT $\{(L_i,a_i,b_i,\alpha_i)/0\leq i<6\,N-1\}$. Any known interpolation method can be used, for example bilinear interpolation of the two closest LUT entries.

In step 4 above, after hue mapping, chroma compression or expansion can be applied in order to bring the mapped colors into the target color gamut—by compression—or in order to make the mapped colors populating the entire target color gamut—by expansion. In case of compression, for example a chroma mapping algorithm can be used that maps colors along straight mapping trajectories that are anchored each to an anchor point belonging to the achromatic L-axis. Each hue mapped color is chroma mapped onto a target color in direction to the anchor point along a mapping trajectory. The mapping of a hue mapped color can be described as a modification of the distance D of this hue mapped color from the anchor point into a distance D' of the resulting target color from the same anchor point.

In order to map D to D', the well known three segment mapping function can be used such as discussed by Montag et al. in their paper entitled "Gamut mapping: Evaluation of chroma clipping techniques for three destination gamuts" and published at the IS&T/SID Sixth Color Imaging Conference. This mapping function has
  a first segment having a slope of one covering 40% of the chroma,
  a last segment being a hard clipping,
  and a middle segment connecting the other two segments covering 60% of chroma.

These examples, as well as the principles described in connection with steps 1-4 may be performed by block 507 of method 500 illustrated in FIG. 5.

Figure 6:
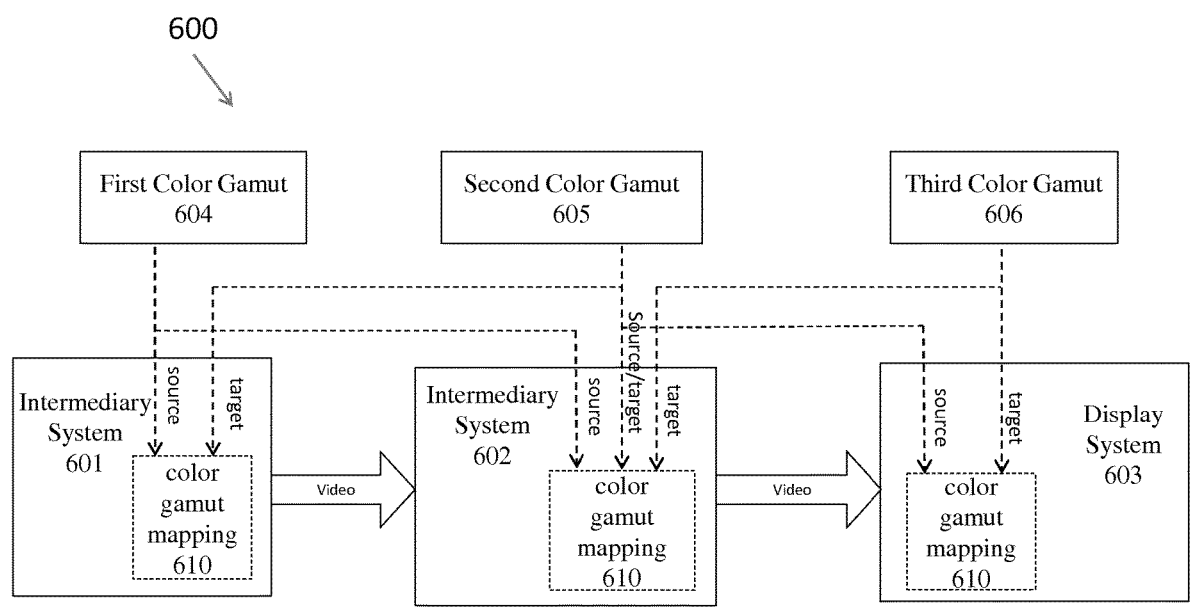
FIG. 6 illustrates an exemplary system in accordance with present principles.

FIG. 6 illustrates an exemplary system 600 in accordance with present principles. The system 600 may include one or more of intermediary system 601, intermediary system 602 and display system 603. As it can be appreciated, system 600 may include only one of these systems 601-603. Alternatively, system 600 may include some or all of the systems 601-603. Alternatively, system 600 may include additional or different systems for performing color gamut mapping other than systems 601-603. In one example, each of the systems 601-603 may be a device similar to device 700 of FIG. 7. Alternatively, each of the systems 601-603 may be implemented in whole or in part with device 700 of FIG. 7.

System 600 illustrates first color gamut 604, second color gamut 605, and third color gamut 606. Or one or more of the color gamuts 604-606 may be included, or different color gamuts than the examples provided herein may be further included.

Each of the color gamuts 604-606 may be received or may be signaled. Additionally, as used herein, the word "signal" refers to indicating something, e.g., information of a stored color gamut or color gamut mapping information. For example, a system may receive a signal identifying a known color gamut (e.g., a standardized color gamut). A system may signal one or more parameters relating to a color gamut in order to make a system aware of which color gamut is utilized on the color gamut mapping system side. In this way, parameters or identifiers may be utilized to identify color gamuts. By avoiding transmission of any actual parameters, savings may be realized. It is to be appreciated that signaling may be accomplished in a variety of ways. For example, one or more syntax elements, flags, and so forth may be used to signal information.

Each of the color gamuts 604-606 may correspond to color gamuts, such as the color gamuts of a display panel, of a camera, of present or future color gamut standards (e.g., NTSC, rec. 709, rec. 2020, Adobe RGB, and DCI-P3). The color gamuts 604-606 may be received from any device/system (e.g., from a device delivering the input content, such as a camera, a set top box, a Blu-ray player, a camera sensor, a HDMI receiver, a communication interface). The color gamuts may alternatively or in addition be compliant with a standard (e.g. rec.709, rec.2020)). The color gamuts may be received via any medium (e.g., a mobile network (including 3G or 4G network), a wireless network (including Wi-Fi, Bluetooth network or links), a TV Broadcast network (e.g. DVB or ATSC receiver interface), a wired network (including web network), a wired link or bus (including HMDI, USB), an optical disk player (including DVD or Blu-Ray player, a video stream or a storage medium (e.g. a Blu-Ray Disk, a memory).

Each of the systems 601-603 may include a color gamut mapping block 610. The color gamut mapping block 610 may perform color gamut mapping in accordance with the principles described in connection with FIG. 5 and steps 1-4. The color gamut mapping 610 may be performed locally or may be performed in whole or in part remotely (e.g., on a server, in the cloud).

In one example, intermediary system 601 may be a camera. The intermediary system 601 may perform color gamut mapping 610 in accordance with present principles to map a camera sensor color gamut to another color gamut (e.g., a standardized color gamut, or the color gamut of the camera display). In one example, intermediary system 601 may be a broadcaster encoder. The intermediary system 601 may perform color gamut mapping 610 in accordance with present principles to map a color gamut of the original video content (e.g., a standardized color gamut like rec. 2020) to a color gamut of the transmission channel (e.g., a standardized color gamut like rec. 709). In one example, intermediary system 602 may be a set-top box system, a video recorder, or a Blu-ray player for performing color gamut mapping between two different standards (e.g. NTSC, rec. 709, rec. 2020, Adobe RGB, and DCI-P3). As shown in FIG. 6, the source color gamut, the target color gamut or both the source and target color gamut may be provided to intermediary system 602. In one example, there may be multiple intermediary systems 602 that may perform color gamut mapping during the transmission/reception of color gamut information. In one example, display system 603 may be a display. The display system 603 may perform color gamut mapping 610 in accordance for present principles to map the color gamut of the video content (e.g. utilizing rec. 2020) to the color gamut of the physical display panel (e.g. defined by its primary and the secondary colors).

Alternatively, each of the systems 601-603 may apply an LUT that was determined in accordance with the principles described in connection with FIG. 5 and steps 1-4. The LUT may be determined based on hue rotation in accordance with present principles. In this particular case, the hue rotation angle for the specific colors (e.g. primary colors and/or secondary colors) may be obtained utilizing steps 1-4. During the generation of the LUT, each possible color input of the LUT may be provided as input to the apply hue rotation (e.g., block 508 of FIG. 5). The output of the apply hue rotation is then stored in the LUT as corresponding to the possible color input.

In one example, during the generation of the LUT, depending on the format of the LUT input (e.g. RGB or YUV, 8 bit, 12 bit or 16 bit), each possible LUT input color value may be optionally first converted (e.g., block 509) to the working color space (e.g. Lab or IPT). The hue rotation angle may then be determined for each possible LUT input value. The hue rotation may then be applied (e.g., block 508) to the color before the optional conversion (e.g., block 510) to the LUT output color space (e.g. Lab, IPT, RGB, or YUV). The output color value may be known as the LUT result and may be stored in the LUT. The LUT input may have a smaller resolution than the actual system input and the missing information may be interpolated before applying the LUT. Thus, the LUT provides a mapping of input LUT colors to resulting LUT processed colors, where the resulting LUT colors are processed in accordance with present principles, including the principles described in connection with steps 1-4 and FIG. 5.

Figure 7:
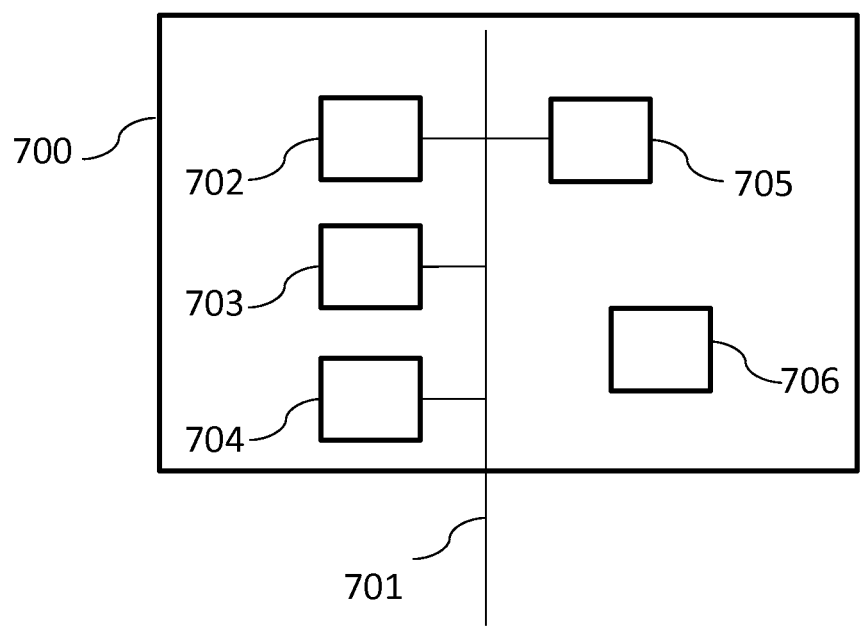
FIG. 7 illustrates an exemplary device in accordance with present principles.

FIG. 7 represents an exemplary architecture of a device 700 which may be configured to implement methods described in relation with FIG. 5 and steps 1-4. The present principles may be performed locally or may be performed in whole or in part remotely (e.g., on a server, in the cloud). As described above, device 700 may be part of one or more systems 601-603 of FIG. 6.

In one example, FIG. 7 represents an apparatus that may be configured to implement the color processing methods according to present principles.

Device 700 comprises following elements that are linked together by a data and address bus 701:
a microprocessor 702 (or CPU), which is, for example, a DSP (or Digital Signal Processor);
a ROM (or Read Only Memory) 703;
a RAM (or Random Access Memory) 704;
an I/O interface 705 for reception of data to transmit, from an application; and
a battery 706 (or other suitable power source).

According to an example, the battery 706 is external to the device. In each of mentioned memory, the word «register» used in the specification can correspond to area of small capacity (some bits) or to very large area (e.g. a whole program or large amount of received or decoded data). ROM 703 comprises at least a program and parameters. Algorithm of the methods according to the invention is stored in the ROM 703. When switched on, the CPU 702 uploads the program in the RAM and executes the corresponding instructions.

RAM 704 comprises, in a register, the program executed by the CPU 702 and uploaded after switch on of the device 700, input data in a register, intermediate data in different states of the method in a register, and other variables used for the execution of the method in a register.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users. The system 700 may include memory 703 and/or 704 and processor(s) 702. In one example, the processor 702 may perform the operations described in connection with FIG. 5. In one example, the memory 703 and/or 704 may store data related to the operations described in connection with FIG. 5.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage. Other hardware, conventional and/or custom, may also be included.

Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

While the present invention is described with respect to a particular embodiment, it is understood that the present invention is not limited to this embodiment. The present invention as claimed therefore includes variations from this embodiment described herein, as will be apparent to one of skill in the art.

It is to be further understood that, because some of the constituent system components and methods depicted in the accompanying drawings are preferably implemented in software, the actual connections between the system components or the process function blocks may differ depending upon the manner in which the invention is implemented.

The invention claimed is:

1. A method comprising:
   accessing a first set of colors comprising colors on a curve going through an achromatic color, a specific color of a first source color gamut, a specific color of a second source color gamut, and a specific color of a target color gamut, wherein colors lying on the curve are source colors from either the first source color gamut or the second source color gamut, wherein the specific color of the first source color gamut and the specific color of the second source color gamut are on the curve between the achromatic color and the specific color of the target color gamut;
   accessing a second set of colors comprising colors on a line of a constant hue corresponding to a hue of the corresponding specific color of the target color gamut; and
   color gamut mapping one color among colors lying on the curve towards the target color gamut, wherein the color gamut mapping is based on a hue difference between a hue of a first color from the first set of colors and a hue of a second color from the second set of colors, the second color from the second set of colors having a same chroma as the first color from the first set of colors, wherein the hue difference depends on the same chroma of the first color or the second color;
   wherein the achromatic color is common to the first source color gamut, the second source color gamut, and the target color gamut; and
   wherein the specific color of the first source color gamut, the specific color of the second source color gamut, and the specific color of the target color gamut are a same color in the first source gamut, the second source gamut, and the target color gamut, respectively, selected from a group of primary colors and secondary colors.

2. The method of claim 1, wherein the first source color gamut, second source color gamut, and the target color gamut are in at least one color space having a lightness axis and a chromaticity plane, and wherein color gamut mapping comprises rotating a hue of the one color towards a hue of a mapped color based on the hue difference.

3. The method of claim 1, wherein color gamut mapping further comprises determining a third color from the first set of colors and interpolating a hue of the third color from the first set of colors based on the hue difference for the first color from the first set of colors and a hue difference for the third color from the first set of colors.

4. The method of claim 1, wherein color gamut mapping further comprises saturation compressing such that mapped colors are within the target color gamut or saturation expanding such that the mapped colors populate a larger part of the target color gamut.

5. The method of claim 1, wherein the hue difference corresponds to a hue rotation angle for the first color from the first set of colors, such that when any sample color from the first set of colors is rotated by the hue rotation angle, a mapped sample color of the first set of colors coincides with a color of the second set of colors.

6. The method of claim 1, wherein the second source color gamut is a content color gamut.

7. The method of claim 1, wherein the curve results from selection of the specific color of the first source color gamut, the specific color of the second source color gamut, and the specific color of the target color gamut.

8. The method of claim 1, wherein the first source color gamut is different from the target color gamut, the second source color gamut is different from the target color gamut, and the first source color gamut is different from the second source color gamut.

9. The method of claim 1, wherein a first hue leaf color of a first hue leaf is mapped in a first manner, and a second hue leaf color of the first hue left is mapped in a second manner that is different from the first manner, wherein hue mapping of colors of the first hue leaf depends on chroma of colors of the first hue leaf.

10. A system comprising:
    at least one processor; and
    at least one memory having stored instructions operative, when executed by the at least one processor, to cause the at least one processor to:
    access a first set of colors comprising colors on a curve going through an achromatic color, a specific color of a first source color gamut, a specific color of a second source color gamut, and a specific color of a target color gamut, wherein colors lying on the curve are source colors from either the first color gamut or the second color gamut, wherein the specific color of the first source color gamut and the specific color of the second source color gamut are on the curve between the achromatic color and the specific color of the target color gamut;
    access a second set of colors comprising colors on a line of a constant hue corresponding to a hue of the corresponding specific color of the target color gamut; and
    color gamut map one color among colors lying on the curve towards the target color gamut, wherein the color gamut mapping is based on a hue difference between a hue of a first color from the first set of colors and a hue of a second color from the second set of colors, the second color from the second set of colors having a same chroma as the first color from the first set of colors, wherein the hue difference depends on the same chroma of the first color or the second color;
    wherein the achromatic color is common to the first source color gamut, the second source color gamut, and the target color gamut; and
    wherein the specific color of the first source color gamut, the specific color of the second source color gamut, and the specific color of the target color gamut are a same color in the first source gamut, the second source gamut, and the target color gamut, respectively, selected from a group of primary colors and secondary colors.

11. The system of claim 10, wherein the first source color gamut, the second source color gamut, and the target color gamut are in at least one color space having a lightness axis and a chromaticity plane, and wherein gamut color mapping comprises rotating a hue of the one color towards a hue of a mapped color based on the hue difference.

12. The system of claim 10, wherein color gamut mapping further comprises determining a third color from the first set of colors and interpolating a hue of the third color from the first set of colors based on the hue difference for the first color from the first set of colors and a hue difference for the third color from the first set of colors.

13. The system of claim 10, wherein color gamut mapping further comprises saturation compressing such that mapped colors are within the target color gamut or saturation expanding such that the mapped colors populate a larger part of the target color gamut.

14. The system of claim 10, wherein the hue difference corresponds to a hue rotation angle for the first color from the first set of colors, such that when any sample color from the first set of colors is rotated by the hue rotation angle, a mapped sample color of the first set of colors coincides with a color of the second set of colors.

15. A non-transitory computer-readable storage medium having stored thereon instructions that are operative, when executed by a processor, to cause the processor to perform:
accessing a first set of colors comprising colors on a curve going through an achromatic color, a specific color of a first source color gamut, a specific color of a second source color gamut, and a specific color of a target color gamut, wherein colors lying on the curve are source colors from either the first color gamut or the second color gamut, wherein the specific color of the first source color gamut and the specific color of the second source color gamut are on the curve between the achromatic color and the specific color of the target color gamut;
accessing a second set of colors comprising colors on a line of a constant hue corresponding to hue of the corresponding specific color of the target color gamut; and
color gamut mapping one color among colors lying on the curve towards the target color gamut, wherein the color gamut mapping is based on a hue difference between a hue of a first color from the first set of colors and a hue of a second color from the second set of colors, the second color from the second set of colors having a same chroma as the first color from the first set of colors, wherein the hue difference depends on the same chroma of the first color or the second color;
wherein the achromatic color is common to the first source color gamut, the second source color gamut, and the target color gamut; and
wherein the specific color of the first source color gamut, the specific color of the second source color gamut, and the specific color of the target color gamut are a same color in the first source gamut, the second source gamut, and the target color gamut, respectively, selected from a group of primary colors and secondary colors.

16. The non-transitory computer-readable storage medium of claim 15, wherein color gamut mapping further comprises determining a Look Up Table (LUT), wherein the LUT includes a mapping of input LUT colors to resulting LUT colors determined based on the color gamut mapping for the colors of the first source color gamut or the second source color gamut towards the target color gamut based on the hue difference.

17. The non-transitory computer-readable storage medium of claim 15, wherein the first source color gamut, the second source color gamut, and the target color gamut are in at least one color space having a lightness axis and a chromaticity plane, and wherein color gamut mapping comprises rotating a hue of the one color towards a hue of a mapped color based on the hue difference.

18. The non-transitory computer-readable storage medium of claim 15, wherein color gamut mapping further comprises determining a third color from the first set of colors and interpolating a hue of the third color from the first set of colors based on the hue difference for the first color of from the first set of colors and a hue difference for the third color from the first set of colors.

19. The non-transitory computer-readable storage medium of claim 15, wherein color gamut mapping further comprises saturation compressing such that mapped colors are within the target color gamut or saturation expanding such that the mapped colors populate a larger part of the target color gamut.

20. The non-transitory computer-readable storage medium of claim 15, wherein the hue difference corresponds to a hue rotation angle for the first color from the first set of colors, such that when any sample color from the first set of colors is rotated by the hue rotation angle, a mapped sample color of the first set of colors coincides with a color of the second set of colors.

* * * * *